United States Patent [19]
Smith

[11] Patent Number: 4,604,054
[45] Date of Patent: Aug. 5, 1986

[54] RADIANT HEATING

[76] Inventor: Thomas M. Smith, 1415 Golf Rd., Cinnaminson, N.J. 08077

[21] Appl. No.: 752,908

[22] Filed: Jul. 8, 1985

Related U.S. Application Data

[63] Continuation-in-part of Ser. No. 435,412, Oct. 20, 1982, abandoned, and a continuation-in-part of Ser. No. 567,270, Dec. 30, 1983, abandoned, and a continuation-in-part of Ser. No. 628,989, Jul. 9, 1984, and a continuation-in-part of Ser. No. 592,793, Mar. 23, 1984.

[51] Int. Cl.⁴ .............................................. F23D 13/12
[52] U.S. Cl. ..................................................... 431/328
[58] Field of Search ................................. 431/328, 329

[56] References Cited

U.S. PATENT DOCUMENTS 3,067,811 12/1962 Webster ............................... 431/328
3,785,763 1/1974 Bratko ................................. 431/328
3,814,573 6/1974 Karlovetz ........................... 431/329

Primary Examiner—Carroll B. Dority, Jr.
Attorney, Agent, or Firm—Connolly & Hutz

[57] ABSTRACT

Improved infra-red irradiators and use thereof for soldering, domestic water heating, furnace treatment, drying and moisture profiling of paper webs. Burners can have a ceramic fiber mat held over a shallow combustion mixture plenum essentially completely spanned by a baffle. Mats can have folded-in edges to permit close packing. The plenum can have a partition forming a small ignition compartment with an igniter against the covering portion of the mat. Burners can be fitted to heat radial chambers on a rotating table lehr.

4 Claims, 27 Drawing Figures

RADIANT HEATING

This application is a continuation-in-part of application Ser. Nos. 435,412 filed Oct. 20, 1982 (subsequently abandoned); 567,270 filed Dec. 30, 1983, now abandoned; 628,989 filed July 9, 1984 and 592,793 filed Mar. 23, 1984.

These parent applications are in turn direct or indirect continuations-in-part of Ser. Nos. 775,838 filed Mar. 9, 1977 (now U.S. Pat. No. 4,272,237 granted June 9, 1981); 952,332 filed Oct. 18, 1978 (now U.S. Pat. No. 4,326,843 granted Apr. 27, 1982); 20,079 filed Mar. 13, 1979 (now U.S. Pat. No. 4,290,746 granted Sept. 22, 1981); 178,121 filed Aug. 14, 1980 (now U.S. Pat. No. 4,373,904 granted Feb. 15, 1983); 186,491 filed Sept. 12, 1980 (now U.S. Pat. No. 4,378,207 granted Mar. 29, 1983); 279,081 filed June 30, 1981 (now U.S. Pat. No. 4,416,618 granted Nov. 22, 1983); 312,730 filed Oct. 19, 1981 (now U.S. Pat. No. 4,443,185 granted Apr. 17, 1984); and 509,161 filed June 29, 1983 (now U.S. Pat. No. 4,500,283 granted Feb. 19, 1985).

The present invention relates to gas-fired radiant heaters as in U.S. Pat. Nos. 4,272,237, 4,290,746 and 4,378,207, and to equipment with which they are used. Such burners have a panel of interfelted ceramic fibers, a gaseous combustion mixture being continually passed through the panel and burned at the panel face from which it emerges. The combustion takes the form of a flame that extends over the entire area of the face from which the combustion mixture emerges, the flame length being very small so that the surface fibers at the flame are heated to red heat or hotter and form an essentially continuous wall of heat that makes a very effective radiator of highly concentrated heat. By increasing or decreasing the rate of flow and/or changing the composition of the combustion mixture, the temperature of the heated fibers can be controlled. The contents of U.S. Pat. Nos. 4,272,237 and 4,378,207 are hereby incorporated herein as though fully set forth.

Among the objects of the present invention is the provision of novel heater structures that are simple to construct and provide improved operation.

The foregoing as well as additional objects of the present invention will be more fully understood from the following description of several of its exemplifications, reference being made to the accompanying drawings in which.

Figure 1:
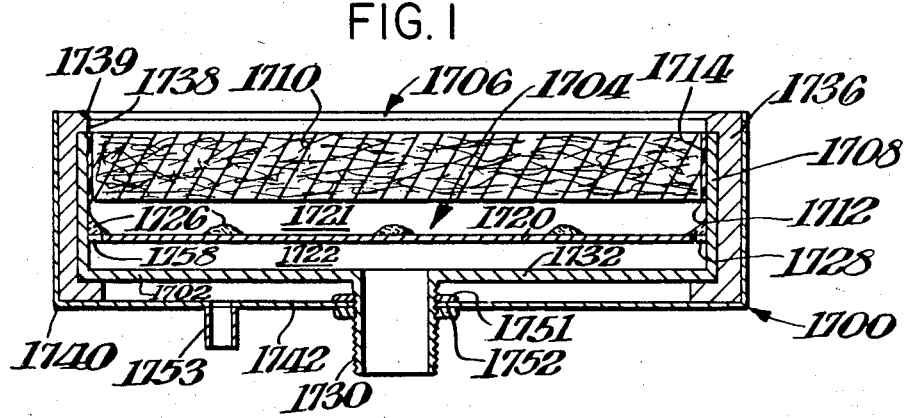
FIG. 1 is a sectional view of a heater construction pursuant to one aspect of the present invention.

FIG. 1 shows a burner 1700 that operates well without the so-called air-seal of the parent applications and the cited patents. Burner 1700 has a body 1702 of relatively thick metal and shaped, as by welding together rectangular plates, to provide the combustion mixture plenum 1704. The mouth 1706 of the plenum body receives a ceramic fiber matrix 1710 which is shown with its edges adhered to the inside surface 1712 of the mouth by a cement 1714 that withstands temperatures at least as high as 400° F., preferably at least as high as 450° F. or 500° F.

A silicone cement is very effective for this purpose.

The mixture plenum is relatively shallow, only about an inch deep, and it is separated into upper and lower chambers by a partition 1720 extending across it. The partition is slightly smaller than the plenum in length and width and is tack-welded at spaced locations 1726 to the plenum walls so as to leave a narrow passageway 1728 around its periphery. A threaded connector 1730 is welded into an opening in the back wall 1732 of the burner to receive the combustion mixture, and another connector can be similarly provided for pressure measurement, if desired.

Burner 1700 is illustrated as also having its side walls 1708 surrounded by insulation. Preformed blocks 1736 of insulation that can be made of the same material as the matrix 1710, are shaped to fit against those side walls as well as over the top and under the bottom of each wall. Each block can run the full length of the wall it fits against, and the blocks can be mitered together at the burner corners. The blocks can be cemented in place, or strapped around the burner with baling straps or the like, or they can be held by an enveloping frame 1740. Such a frame need only be a very thin gauge metal sheet notched out at the corners and folded into the box shape shown. The frame can be cemented to the insulation blocks, or a baling strap can be clamped about the frame, or the frame can have its corners welded or crimped together to make a self-supporting structure that holds the insulation blocks in place and protects them against physical damage.

The frame can be secured as shown in FIG. 1 by providing its floor 1742 with an opening that fits snugly around connector 1730 and clamping it to that connector, between two nuts 1751, 1752 threaded to the exterior of the connector. An additional connector 1753 can also be fitted in the frame floor to deliver a cooling gas to the interior of the frame so as to cause the gas to pass through the insulation blocks and escape at the mouth of the frame to thus reduce the absorption of heat by the burner walls 1708 from the hot combustion gases.

As also shown in FIG. 1, the insulation blocks can have a nose 1738 that covers most or all of the upper edge of a burner wall 1708, to further impede the flow of heat to that wall.

The outermost projection of the insulation blocks 1736 can also be beveled as shown at 1739. This reduces the likelihood of physical damage at that location and also makes the projecting insulation face better reflect away incoming infra-red radiation that would otherwise reach the matrix face and tend to overheat it.

The elaborate protection features of FIG. 1 can be dispensed with. Thus a burner having a body made of aluminum about $\frac{1}{8}$ inch thick operates very effectively without the help of any external insulation or air flow, and even if the burner is not equipped with the plenum partition 1720. Although the matrix 1710 is installed in such a burner as a slip fit so that it is only held in place by silicone cement or resin applied as a very thin film to the matrix edges and to the burner wall which it engages, the matrix remains securely held in place by the silicone through many hours of face-up operation with the outer matrix surface at 1600° F.

Removal of the matrix after such operation shows the silicone to be essentially undamaged, even at the lip where the silicone is in contact with incandescent matrix fibers. It appears that a metal wall $\frac{1}{8}$ inch thick having the thermal conductivity of aluminum withdraws heat from the silicone layer so rapidly that it keeps the layer from heating up to the temperature at which it begins to be damaged.

Silicone layers about 40 mils thick may begin to be damaged where they are in contact with incandescent fibers, but if there is such damage it is confined to the portion of the layer most remote from the heat-withdrawing side wall and does not significantly impair the operation of the burner or shorten its useful life. Compounding the silicone with particles of finely divided metal such as aluminum or copper makes the silicone more readily conductive to heat and keeps it from being significantly damaged when in a layer as much as 60 mils thick.

Copper has a thermal conductivity substantially higher than that of aluminum and can be used in place of aluminum for the burner body. A copper body will provide the operation described above even when its wall thickness is only about 70 mils. Steel on the other hand has a thermal conductivity poorer than aluminum, and a steel wall thickness of about $\frac{1}{4}$ inch provides about the same results as a $\frac{1}{8}$ inch thick aluminum wall.

In order to better allow for the simple sliding of a matrix in place in the burner of FIG. 1, the walls 1708 of the burner body are preferably joined together at the corners so as to present an essentially zero inside corner radius. Thus the body can be made from a square or rectangular metal sheet whose corners are notched out to leave four flaps projecting from a center panel. These flaps are then readily folded up to make the walls, and then joined together at their corners. They can, for example, be welded together with the welding effected at the external portions of the corners without deforming the inside aspect of the corners and without depositing weld metal on those insides.

Alternatively the walls can be joined at their corners by brazing, and even by cementing as with a silicone resin. Although such resins are frequently of rubbery or yieldable nature, the burner body metal is so thick that it provides adequate rigidity to burners whose wall corners are cemented together even when the burner faces are as large as one foot by two feet.

When the plenum partition 1720 is used and welded to the walls, it serves to greatly increase the rigidity of the burner body and make edge cementing practical for still larger sized burners.

A burner with the foregoing corner construction readily receives a matrix that is merely cut with its edges perpendicular and true, and no effort is needed to round off the matrix corners. Such a cut matrix is merely thinly buttered over its edges with the cement, a thin bead of cement is applied along the inside faces of the upper portions of the walls, the matrix is laid flat on a table top, and the burner body turned face down and lowered over the matrix until the burner lips also rest on the table top. The assembly is then permitted to stand an hour or so to allow the cement to cure, after which the burner is ready for use.

The burner without the external insulation and without the plenum partition can also be operated face down or with the plane of its matrix vertical, but the burner body is then subjected to heating by the rising hot combustion gases and becomes hotter than it does when operated face up. For such more rigorous operation, it is preferred that the matrix temperature be not over about 1450° F., or that the operation be discontinuous so that the temperature of no part of the burner walls reaches 500° F.

The application of external insulation to the exterior of the uppermost burner wall when the burner is operated tilted, or to the exterior surfaces of all walls when the burner is operated face down, keeps the burner body cooler. Such insulation need only be about $\frac{1}{4}$ inch thick but should be thicker when it is to be in the form of a fitted block as shown in FIG. 1. It is perfectly adequate in most cases however to merely wrap a strip of insulation blanket around all four outer walls of the burner, and strap the wrapped strip in place.

The use of the plenum partition 1720 also helps cool the side walls inasmuch as the partition causes all of the cold combustion mixture to sweep past the inside surfaces of those walls and thus cool them by an appreciable amount. A burner so constructed operates continuously face down without external insulation but with the maximum matrix temperature about 1500° F.

The cooling effect of the partition is increased by welding a greater proportion of its edge to the walls so that the partition helps conduct heat away from the walls. Also diminishing the depth of the plenum 1704 between the matrix and the burner back 1732 shortens the path by which heat is conducted from lips of the side walls back to the burner back and to the combustion mixture supply pipe, and this also helps cool the walls better. Thus the plenum depth can be made as small as $\frac{3}{8}$ inch, the corners of the plenum can be beveled, and/or the matrix itself can be made relatively thin, 1 inch or ⅛ inch, to improve the rate of heat flow away from the burner lips.

With a burner floor about ⅛ inch thick, the connector 1730 need not be welded in place, but can be threadedly engaged in that floor. For this purpose the floor has a connector opening punched out, the edge of that opening threaded, and the connector then threaded into it. If desired the punching out of the opening can be arranged to also draw some of the metal out around the margin of the opening and thus leave the metal edge of the cut longer than the original floor thickness. This provides a longer distance for the thread to extend over at the cut, and strengthens the threaded connection to connector 1730.

The matrix 1710 is not required to be a slip fit in the burner mouth, but can be a tight fit that calls for forcing the matrix into place with its edges squeezed against the burner walls. Such a forced insertion generally squeezes out some of the resin that may be buttered over the matrix edges, so that it is then desirable to use a little extra resin for this arrangement or to use a matrix that has its edges pre-treated with resin that is allowed to cure or partially cure, and then butter the thus cured edges with less resin.

Alternatively the matrix can be loosely cemented to the side walls while those walls are not fully bent over to their final position, and the walls subsequently bent to the final position to thus squeeze against the matrix edges. Such a final bending can bring the walls a few degrees past the perpendicular so that they taper toward each other and thus lock the matrix in against being blown out by the pressure in the plenum.

The inner faces of the side walls can also be provided with cooling fins, particularly when a plenum partition is used, to further improve the transfer of heat from the side walls to the combustion mixture passing through the plenum. Such fins are readily provided by casting the burner body, and such a construction is illustrated in the burner 1800 of FIG. 2.

Burner 1800 has a matrix 1810 cemented in place at 1814 against the side walls 1812 of a burner body 1802, and seated against the upper ends of a set of fins 1831 cast in place when the body is cast.

To make sure the matrix is held in place, one or more securing rods 1820 is fitted through the matrix and received in sockets drilled laterally into the wall of mouth 1806. Where the sockets penetrate through that wall a little silicone cement can be painted over the outer face of the sockets to help guard against leakage of combustion mixture. Such securing rods are particularly helpful with burner bodies in which the side walls flare outwardly a little and are thus less expensive to cast.

Burner 1800 is also fitted with a deflector or baffle 1836 that directs the incoming combustion mixture toward the fins. Also the corners of the body 1802 are rounded so that the flow of combustion mixture sweeps along the fins in a more streamlined manner. The deflector 1836 is shown as fitted with a mounting tube 1872 that is threaded and threadedly engages in a combustion mixture inlet 1830 which is formed in the burner floor during the casting. The engagement can be locked in by a bit of cement applied so that it at least partially works its way between engaging portions of the thread and then hardens there. Tube 1872 can also have perforations 1874 to permit the combustion mixture to pass into the plenum 1804.

Figure 2:
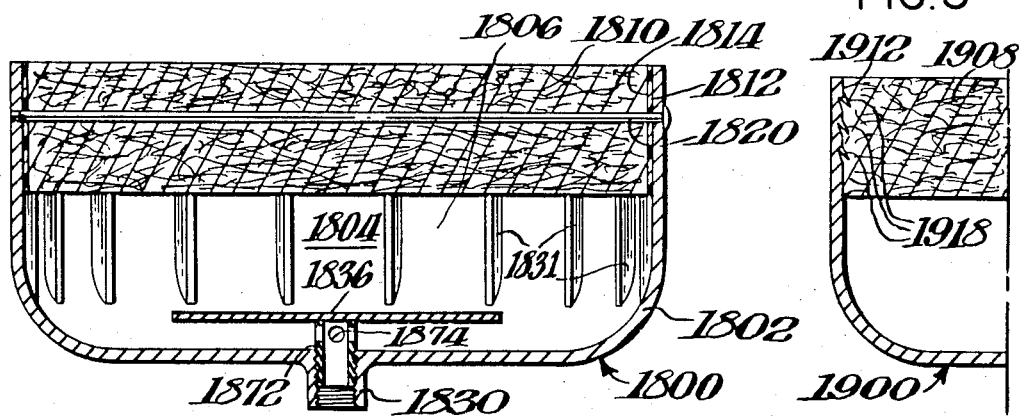
FIG. 2 is a sectional view of a modified construction exemplifying the present invention.

The thermal sheathing of FIG. 1 can be used with the construction of FIG. 2 or in place of the thermal sheathing in the construction of U.S. Pat. No. 4,272,237, in which event the FIG. 1 sheathing can cover the entire upper face of the hold-down frame 342, or can leave exposed a narrow width of frame edge bordering the exposed matrix face.

Figure 3:
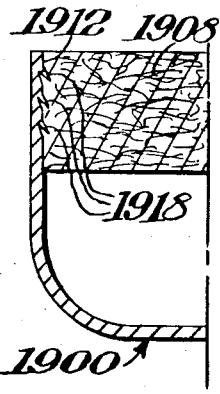
FIG. 3 is a broken-away view similar to FIG. 2 of a further modified construction.

The cementing of the matrix edges to the side walls not only holds the matrix in place but also seals the joint between matrix and side wall, against passage of combustion mixture. Such sealing is not essential however, and the incandescent fibers can directly engage the mouth and the construction as indicated by burner 1900 in FIG. 3. The matrix 1908 can be squeezed in place so that its edges are securely engaged by teeth 1918 staked out of the side walls 1812 and the squeezed matrix is thus locked in place. Such engagement will hold a matrix in place in a plenum 6 inches wide and 12 inches long, against a combustion mixture pressure of as much as 4 inches of water column. For greater pressures or larger dimensions, a little adhesive can be applied between the matrix edge and the plenum mouth and/or screws can be threaded into the side walls from the outside of the burner with the screw shanks penetrating an inch or more into the matrix. No thermal dissipation fins nor partitioning are needed in the construction of FIG. 3 when there is no cement to protect at the matrix edge, although they can be used to keep the metal temperature low. Similarly, the wall thickness at the burner mouth can be thinner than for the constructions in which the matrix is cemented in place, and here too the extra thickness will help hold the metal temperature down.

Figure 4:
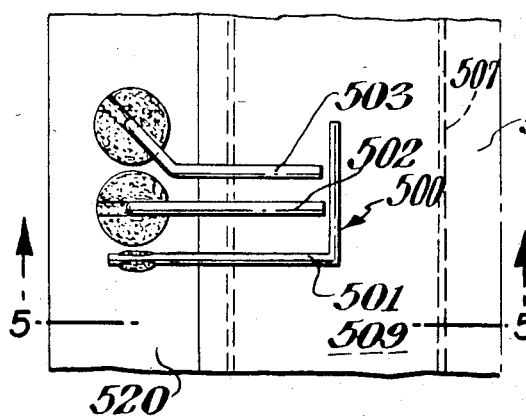
FIG. 4 is a broken-away plan view of a portion of a heater showing a detail feature suitable for use according to the present invention.
Figure 5:
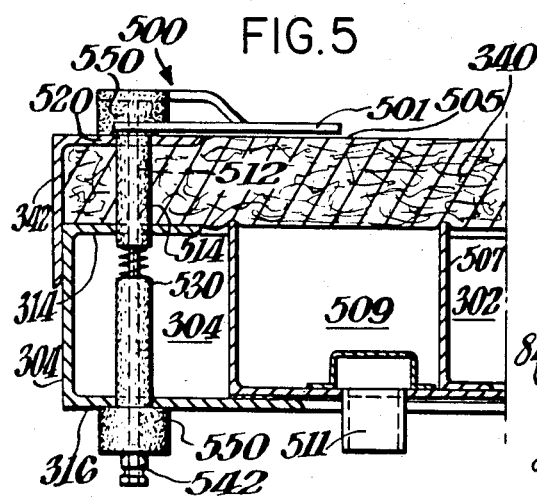
FIG. 5 is a sectional view of the construction of FIG. 9, taken along line 5—5.

The radiant heaters of the present invention can be equipped with automatic igniters such as electric spark igniters or pilot lights. FIGS. 4 and 5 show a particularly desirable automatic igniter construction fitted into a heater of the type illustrated in the parent patents. A standard combustion 500 of spark rod 501, ground rod 502 and flame-checking rod 503 is mounted so that the rods are generally parallel to and about 1/16 inch above the outer face 505 of the porous refractory panel 340. Below the opposite face of the panel underneath the rod assembly the box plenum is provided with a partition 507 that isolates a chamber 509 from the remaining space in the box plenum, and the chamber is fitted with its own supply connector 511 to receive a separate combustion mixture.

The spark rod 501 and flame-checking rod 503 are each housed in two identical insulators 550 which go through aligned openings punched in the top flange 520 of the clamping frame 342 and in the flanges 316 and 314 of plenum 304 as shown in FIG. 4. Ground rod 502 is welded or brazed to flange 520. The ends of rods 501 and 503 projecting out through flange 316 are threaded to each accept a connector 542 which holds them in place and provides a ready connection for necessary wiring.

The construction of FIGS. 4 and 5 is operated to start the burners using a safety check. A separate pilot combustion mixture is first started into chamber 509 an at the same time the spark rod is electrically energized to begin sparking. If the flame rod does not sense a flame within a short period of time, such as 10 and 30 seconds, the flow of combustion mixture can be automatically cut off and the starting sequence must then be manually recycled, preferably after the combustion mixture flow is checked as by purging chamber 509. When the starting sequence causes ignition of the separate combustion mixture, the flame-checking rod 503 senses the ignition and opens the valve that feeds the main combustion mixture into plenum 302 which is then ignited by the flame at chamber 509.

By using a small chamber 509 with a low BTU/hour input for the automatic ignition test, the danger of explosion at ignition is minimized. A chamber volume of about 100 cubic centimeters or less is very effective for this purpose. However, chamber 509 can extend the full length of the burner.

The pilot combustion on the radiating surface of the panel contributes to the overall radiation.

The spacing of the rod assembly from the refractory panel is preferably kept very small so that the rods do not interfere with placing the radiating surface close to the material being irradiated, such as a moving textile web that is being dried. Because the effectiveness of the heater increases when brought close to the material treated, the spacing of the panel from that material is sometimes arranged to be as little as two inches or even less.

Figure 6:
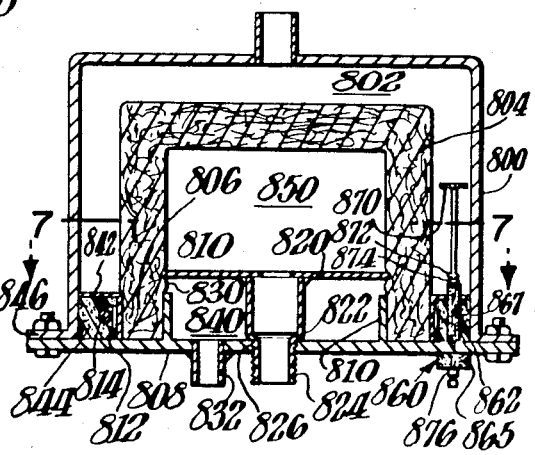
FIG. 6 is a sectional view of a novel heat exchanger incorporating a ceramic fiber heater and illustrative of the present invention.
Figure 7:
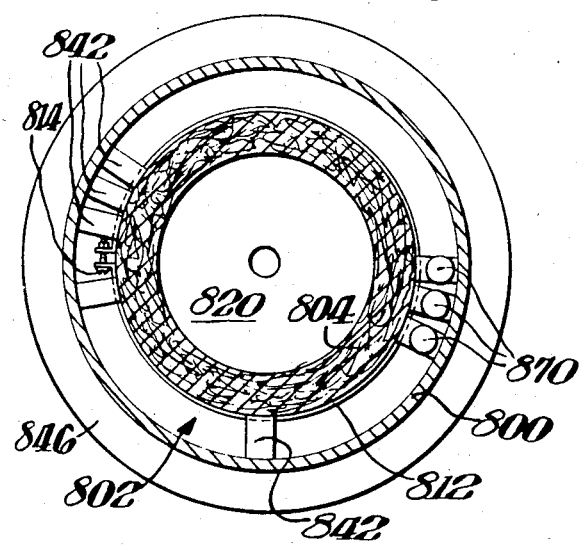
FIG. 7 is a sectional view of the burner of FIG. 6, taken along line 7—7.

FIGS. 6 and 7 show a hot air heat exchanger construction for house heating pursuant to the present invention. Here a cylindrical heat exchanger 800 has a hollow interior 802 in which is received in fibrous panel 804 also of generally cylindrical shape. The panel has an open end 806 clamped to a mounting plate 808 as by means of a rib 810 formed or welded on the plate and around which the panel end is squeezed by a split sheet metal strap 812 whose ends can be pulled together by a tightening screw 814.

Before the panel is fitted in place a partition disc 820, held on a tubular support 822 having an externally threaded extension 824 is mounted on mounting plate 808 which has a threaded aperture 826 that threadedly receives the threaded extension 824.

Partition disc 820 has its periphery located just above the edge of rib 810, to define a marginal slot 830 for discharge of a sealing gas stream through the marginal portion of the panel 804. An inlet nipple 832 provides for the delivery of the sealing gas stream to the sealing plenum 840 below partition disc 820. Extension 824 provides for the supply of combustion mixture to the plenum 850 above the partition disc.

Strap 812 is also shown as carrying a ring of outwardly-extending ears 842 that help retain a mass of insulation packing 844 fitted around the open end of panel 804 when mounting plate 808 is brought into engagement with the mouth 846 of heat exchanger 800. Some of those ears are also perforated to receive an ignition and test assembly 860 shown in the form of a series of ceramic tubes 862 each having an enlarged head 865 threaded into aligned openings in the mounting plate. Through the passageway in each ceramic tube there penetrates a rod 867 having a disc-shaped inner end 870 and staked as at 872 so that it is appropriately located with respect to the ceramic tube. A washer 874 can be slipped over each rod before it is inserted in the ceramic tube, to furnish better positional coaction with the tube and the staking. The outer edge of each rod can be threadedly engaged to a mounting tip 876.

The discs 870 of each rod are arranged so that they are in edge-to-edge opposition suitable for sparking and for flame detection, as described in connection with FIGS. 4 and 5.

The outside of heat exchanger 800 can be located in the circulating air plenum of a standard house heater, or if desired in a water tank containing water to be heated. This heat exchanger can be made of metal or even of glass, borosilicate glass being particularly suited when the heat exchanger is used to heat water. Water to be heated in this way can be colored with dyes, for example, to better absorb radiant energy transmitted through a transparent heat exchanger. Metal heat exchangers are desirably ribbed to increase their effective surface area and thus increase their heat transfer to surrounding air or the like.

Another feature of the present invention is the ability to use an inert or reducing gas to seal the combustion mixture on its way through the porous refractory panel. Thus the sealing gas can contribute to make the burnt combustion mixture provide an atmosphere of exceedingly low oxygen content, or even of strongly reducing ability as, for example, by reason of a significant hydrogen content.

Figure 8:
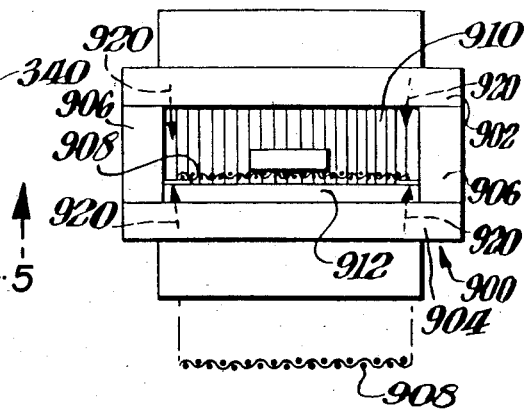
FIG. 8 illustrates an enclosed burner construction of the present invention.

FIG. 8 shows an annealing tunnel furnace 900 having upper and lower radiant heaters 902, 904 facing each other and held in fixed relation by side blocks 906 of thermal insulation. A wire mesh conveyor 908 is arranged to slide through the furnace interior to carry workpieces that are to be annealed or brazed. A strip curtain 910 closes off the entrance to the furnace, above the conveyor. The portion of the entrance below the conveyor is shown as closed by a one-piece wall 912.

The heaters 902, 904 are operated in the manner described above, except that the sealing gas streams, indicated by arrows 920, can be cracked ammonia, or a propane-nitrogen mixture, or pure propane or the like. With such sealing gases, it is preferable to adjust the combustion mixtures so that they have little or no surplus oxygen. The furnace interior then becomes a very effective reducing atmosphere that will prevent oxidation of the workpieces and even reduce any oxidation present on those pieces when they are introduced into the furnace. Notwithstanding the strongly reducing character of the furnace interior, the burning of the combustion mixture takes place very effectively to provide radiation at temperatures at least as high as red heat.

For high heat output from the furnace, the workpieces should be arranged to absorb larger proportions of the infra-red energy, as by packing them very close together in the conveyer 908, or by arranging for a workpiece to be a continuous length of material that spans the entire width of the burner faces.

The heaters of the present invention can be used for soldering with silver solder and even with soft solder, as well as for brazing. For soft soldering the heat requirement is relatively low and a flat-faced burner is more than adequate. Articles having extensive width, such as solar panels, can be very readily soft soldered by heating them with a row of burners, and in such arrangement the burners are preferably placed under the panel so that they are operated with their matrix facing upwardly. In this arrangement the naturally upward flow of combustion gases makes it unnecessary to have the special flow directing structure used for brazing.

Figure 9:
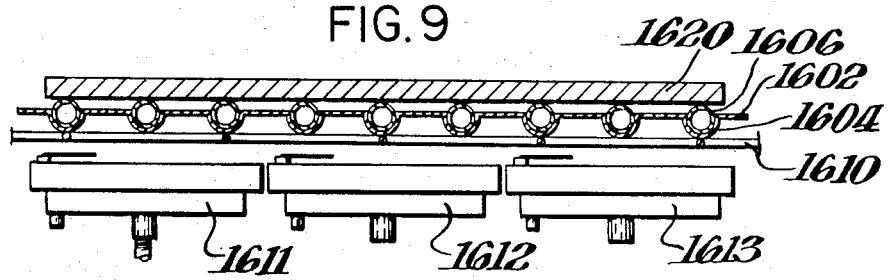
FIG. 9 is a side view of an array of burners operating pursuant to the present invention.

FIG. 9 shows such an arrangement in which a solar panel 1602 is provided with cylindrical depressions 1604 in each of which a length of tubing 1606 is to be soldered. The panel can be many feet in length as well as width, and the tubing even longer so that the tubing ends project beyond the panel and can be connected to fluid supply and withdrawal structure. The panel is held on a grid 1610 of narrow spaced metal strips, and three burners 1611, 1612 and 1613, or three rows of burners, each as long as the panel, are located below it. Because of technical difficulties in manufacturing as well as mounting a single burner matrix as long and wide as panel 1602, each burner is arranged to heat only a limited portion of the panel. A hold-down 1620 is arranged to press down against the tops of tubes 1606 and hold them in place in the depressions.

The depressions carry a quantity of soldering flux and powdered solder, and after a solar panel is mounted in position the burners can be fired and the hold-down pressed down. It takes less than a minute to thus complete the soldering of copper tubes having a 20 mil wall thickness to a copper sheet having a 10 mil thickness.

It is not necessary that the burners be fired at the same instant, so that standard electronic ignition timing arrangements are appropriate notwithstanding the fact such arrangements can inject a time lapse of as much as 5 to 10 seconds between the light-off of the first and last burners. Indeed the outer burners can desirably be lit before the inner one, inasmuch as the heat losses are greater from the sides of the solar panel than from its center.

In the arrangement of FIG. 9, the depressions 1604 are shaped to extend somewhat more than halfway around the tubes, so that the mouth of a depression is slightly narrower than the maximum width of a tube. The tube will then snap in place in the depression and thus more positively be held in the desired position.

However it is not essential to lock the tubes in place. Indeed the tubes can be made with a D-shaped cross-section and the flat portion of their exterior can be soldered against a panel that has no depressions and can be perfectly flat.

To reduce the time required for heating the combination to effect sealing, hot gases such as combusted fuel gas, can be passed through the tubes, with the help of a manifold or header into which the tubes are fitted. The combination is preferably arranged to take place close to the manifold, and the combusted gases diluted with excess air to control the temperature and avoid overheating. At the end of the heating cycle, it is preferred to speed the cooling as by not only terminating all combustion, but continuing the flow of air alone through the burners as well as the tubing. It is also advisable to pre-solder the surface of the tubes where they are going to be soldered to the sheet, and to apply only a thin layer of flux to the sheet at the soldering locations. Alternatively the sheet surface can be pre-soldered.

Lengths of pipe can also be heated by flat-matrix burners, deployed in rows around the entire outer surface of pipes as long as 20 feet, for example. To speed such heating the hot combustion gases can be collected from around the burners and blown through the interior of the pipe, as by surrounding the burner assembly, or the spaces between adjacent burners, with conduit walls that direct the emitted gases to one end of the pipe so that they can be introduced to the pipe interior. The volume of space within large-diameter pipes can be reduced by inserting a mandrel into the pipe interior, so that the hot gases passed through it are confined adjacent the internal surface of the pipe. Swirling baffles can also be mounted around the mandrel to help make the gases moving within the pipe more uniform in temperature. It may be desirable to apply thermal insulation over the outer surface of the mandrel to reduce heat losses. The combustion gases exiting from the interior of the pipe being heated still have sufficient heat for preheating the next pipe to be heated, and for this purpose a pipe to be preheated can be coupled to a pipe being heated.

Burner assemblies such as those of FIG. 9 can also be arranged to fire face down or to fire facing any other direction. Thus they can be connected together to make a radiant roof for heating glass lehrs, for example. One convenient arrangement of this type has a row of elongated burners each connected by its ends to the opposite arms of an overhead rectangular frame. The burners can be spaced a little from each other to permit burnt combustion gases to escape between them, or they can be packed together, preferably with thermal insulation strips squeezed between adjacent burners, to keep those gases from escaping upwardly.

The supporting arms of the frame can be made of metal tubing and can thus also be used to pipe to the burners their gas requirements. Thus the piping frame can carry an air stream which is fed to the air-seal chamber of each air-seal burner in the group, and which is also fed to a gas-air mixer that is separately supplied with gas that it mixes with the air to make a combustion mixture fed to the combustion mixture plenums of the burners. Alternatively the burners can have connections at their opposite ends for receiving the respective supplies, with these ends coupled directly to and opening into the opposed arms of the piping frame, one of these arms carrying air alone, and the other carrying the combustion mixture. Flow-control valves can be provided in the combustion mixture connections to the individual burners for adjusting the burning pattern for the row of burners.

The radiant roof assembly can have its burners with or without air seals and needs no covering over the tops of the downwardly facing burners. Without such covering the burner backs can be directly exposed to the external atmosphere so that those bare backs are thus subjected to very effective cooling by that atmosphere. If the maximum temperatures are desired for workpieces subjected to heating by the roof, it is preferable to use burners without air seals and packed together to minimize upward escape of the combustion gases.

Radiant heating is particularly desirable for glass lehrs because it is not only efficient, particularly when gas-fired, but the heating action on the irradiated glass is more gradual than that of a stream of hot furnace gases. Because of the radiation reflection by the shiny surfaces of the irradiated glass, and the transparency of the transparent glass, intense radiation will generally not cause too much thermal shock. Gas-fired radiant heating has the further advantage of generating large amounts of hot combusted gases that assist the heating of the glass.

Where combustion mixture is passed through a pipe exposed to heating as by the hot combustion gases, or by reflected infra-red radiation, such a pipe is best shielded by insulation to thus minimize danger of undesired ignition in such pipe. Ignition on the matrix surfaces is conveniently supplied by electric igniters, such as those described above which do not take up any space between burners, or such igniters can be mounted at one end or the other of each burner in the pack, and thus permit the long sides of adjacent burners to be brought into engagement with each other.

Figure 10:
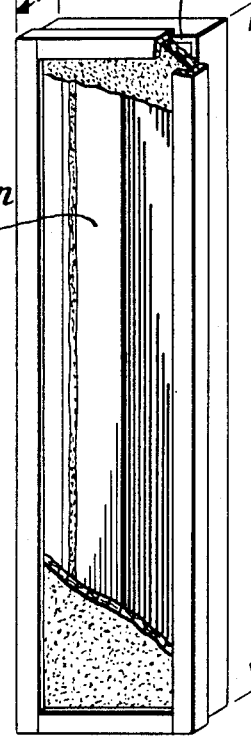
FIG. 10 is an isometric view of a burner showing a detail of the present invention.

It is also helpful to reduce the curling or twisting effects caused by differential heating of portions of a burner. Thus, burners that are about 4 feet long or longer are best built with extra stiffeners welded onto the burner body and these stiffeners are preferably welded to the inner face of the plenum where they are kept cool by the flushing action of the combustion mixture. A 7-foot-long and 1-foot-wide burner body about 2½ inches deep will show little or no curling even though made of 1/16 inch thick stainless steel sheet, when there is welded to the inner face of its combustion mixture plenum a stiffening diffuser which extends the length of the body as shown, for example, in U.S. Pat. No. 3,785,763. This is illustrated in FIG. 10. Welding a stiffener onto the outside surface of the combustion mixture plenum will generally result in thermal curling apparently because the stiffener tends to heat up excessively in such a location. This problem is not so pronounced where the burner body is five or more inches deep or is made of ⅛ inch thick stock of plain carbon steel.

To minimize the thermal twisting of the matrix hold-down frame, which is a member that can get very hot, the matrix can be held in place by a succession of short lengths of angle metal. These can be for instance about 6 inches long, and spaced slightly from the adjacent lengths so that each length is free to expand somewhat as a result of the heating they normally experience.

The individual lengths of hold-down angle can be bolted directly to the back wall of the burner, rather than to the shelf on which the matrix is mounted, to further increase the rigidity of the burner. Such bolts preferably go through the air-seal plenum, as shown for the ignition insulators in FIG. 5 so that they do not have to be fitted to the burner by an air-tight engagement. A little extra air leakage around the bolts does no significant harm.

The short lengths of hold-down angle can also be pre-punched with a series of holes in one or both of their flanges, and these holes can be of a size to receive ignition wires or insulators as in FIG. 5. The shelf on which the matrix rests can also be pre-punched the same way. This simplifies the equipping of the burner with electric ignition; it is only necessary to drill out matching holes from the back wall of the air-seal plenum where the ignition connections are to pass through it.

The bolt holes are pre-punched through that back wall, and it is helpful for the bolt holes in the hold-down angle to be square and dimensioned to receive the square shank of a carriage bolt. Only one bolt per length is required.

The burners of the present invention provide very good radiant heating operation even when facing upward in dusty atmospheres. Combustible particles such as polyethylene are burned away as they fall on the burner matrix, and do not significantly affect the operation. The most serious effect of a dusty atmosphere is generally to disable an electric ignition attachment, and this can be minimized by running the electric current leads from the ignition site through to the air-seal plenum and then along that plenum and out through the air supply conduit connected to that plenum. At a location sufficiently remote from the dusty burner location the ignition wires can be run out from the air supply conduit and connected to the electric ignition control assembly.

To simplify the mounting of the burners, the backs of the burners can have mounting clips welded to them. A simple U-shaped clip can have its central span welded to the burner back to hold the arms of the clip projecting away from the back. These arms can be about an inch apart so that they receive between them a threaded mounting rod the ends of which are fixed in place. The arms can also be provided with small perforations near their ends through which a cotter pin or the like can be passed on the far side of the threaded rod to hold the burner against the rod. Nuts can be threaded on the rod for engagement by the clips, so as to position the burner along the rod.

Figure 11:
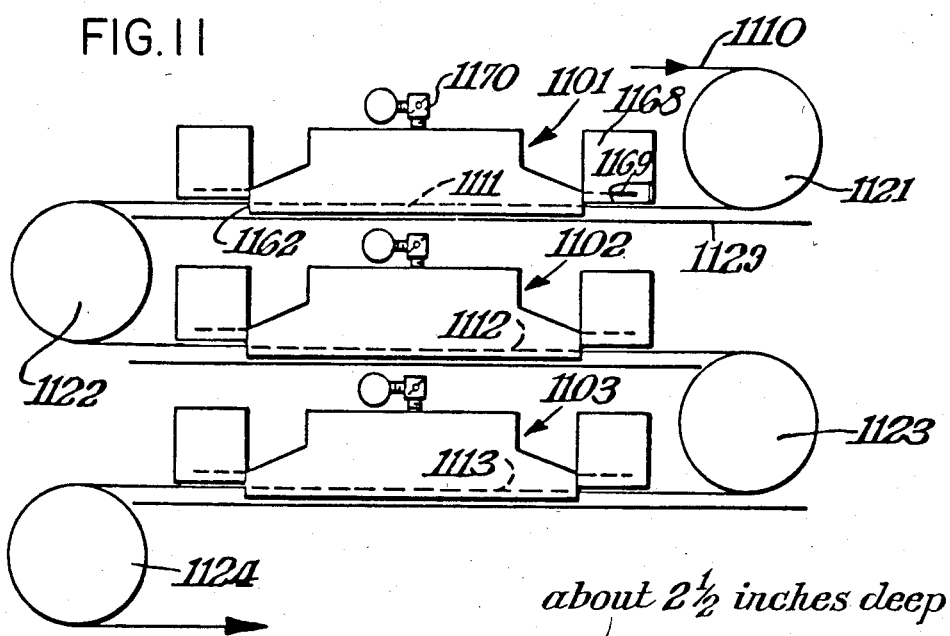
FIG. 11 is a schematic side view of further embodiments of the present invention.
Figure 14:
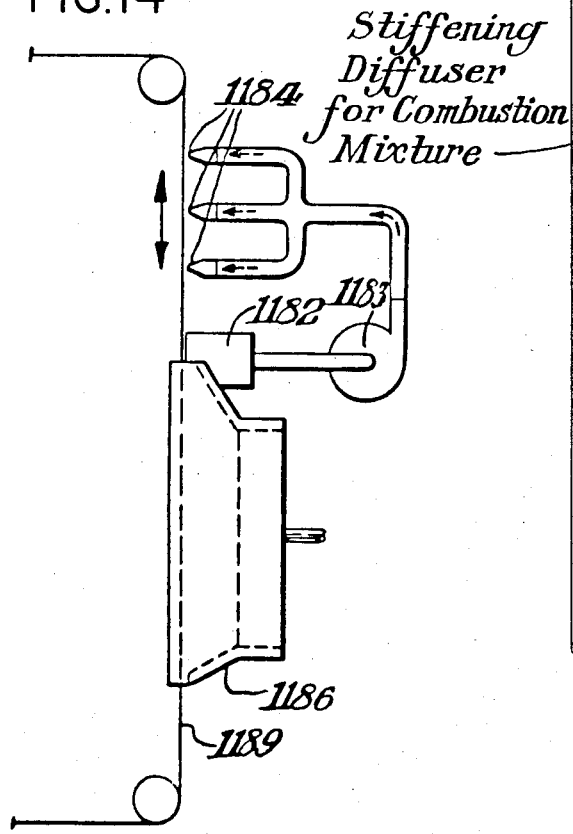
FIG. 14 is a schematic side view of an additional heating apparatus typical of the present invention.

The apparatus of FIG. 11 has a series of rows of downwardly facing burners, three rows of which are shown at 1101, 1102 and 1103. A web of wet paper 1110 makes a series of passes at 1111, 1112 and 1113 below the faces of the burners, with the help of reversing rolls 1121, 1122, 1123 and 1124. The paper can then be wound up, or if further drying is needed can be exposed to additional burners or looped over steam cans or other drying equipment. If desired, all or some of the reversing rolls 1121, 1124 can be internally heated as by steam or other fluid, to make the drying apparatus more compact.

Figure 12:
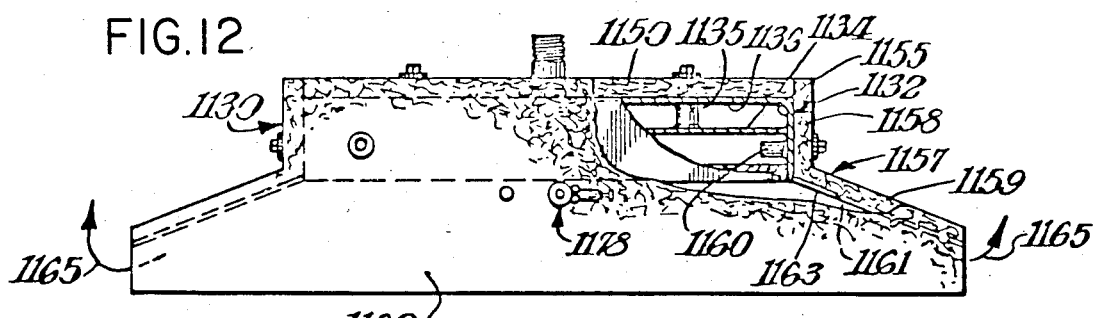
FIG. 12 is an enlarged detail view with parts broken away of a burner in the construction of FIG. 11.

Each row of burners has a set of relatively small side-by-side individual burners 1130 similar to the burner of FIG. 5 of Ser. No. 186,491. As shown in FIG. 12, each burner 1130 has a generally rectangular metal body 1132 of metal like aluminum that conducts heat very well, and with a wall thickness of about ⅛ inch so that it is thick enough to effectively conduct away excessive heat. In FIG. 12 the burner has a combustion mixture deflector plate 1134 supported by posts 1135 secured to the plate and to the back wall 1136 of the burner body. The burner body, plate, and posts are preferably brazed together, as by the molten flux dip brazing technique referred to in U.S. Pat. No. 4,272,238.

Figure 13:
FIG. 13 is a view of the construction of FIG. 11, taken from the face of a burner.

As shown in FIGS. 11, 12 and 13, the hot combustion gas are kept by thermal deflectors 1162 from escaping over the free edges of the burner walls 1164 at the ends of each row. Deflectors 1162 can be mounted to walls 1164 the same way blocks 1157 are mounted, but the deflectors preferably extend downwardly lower than the bottom edges of blocks 1157, to a level below the path of the paper 1110. The hot combustion gases rise and will accordingly flow upwardly around the bottom edges of blocks 1157, as shown by arrows 1165.

FIG. 11 also shows exhaust ducts 1168 that collect the hot combustion gases which can then be used as a heat source for other operations or to pass through rolls 1121-1124 to heat them. Ducts 1168 can be provided with baffles 1169 that direct the hot gases over a few more inches of the paper 1110 before those gases are withdrawn.

Each individual burner of a row can have its own feed trimming valve 1170 that can be adjusted to offset uneven heating effects that may be caused by differences in the porosities of the matrix faces of adjacent burners. The burners in each row can be mounted with their adjacent sides in direct contact, as in FIG. 5 of Ser. No. 186,491, but preferably a compressible pad 1172 of thermally resistant material such as ceramic fibers is fitted between adjacent burners in FIG. 13. Such a pad about ⅜ inch thick compressed to half that thickness does not make too much of a gap in the incandescent surface defined by the burner faces, and it also helps to keep the burner-to-burner joints plugged against the leakage of hot combustion gases as a result of thermal expansion during operation.

A single insulation block or pad can cover the backs of an entire row of burners, if desired, or can cover a single back or any other number of adjacent backs.

The burner sides 1155 that are aligned to make the leading and trailing burner edges across which the paper 1110 moves, are shown in FIGS. 12 and 13 as fitted with insulation blocks 1157 that are molded into angularly related flanges 1158 and 1159. Flanges 1158 are clamped against sides 1155 with the help of posts 1160 similar to posts 1135 that are only secured to the burner side walls. Insulation flanges 1159 flare outwardly from the burner faces, preferably at an angle of about 60 and 80 degrees from the vertical. The lower face 1163 of these flaring flanges can have its surface area effectively increased as by a succession of adjacent grooves 1161. The width of flanges 1159 is preferably from about ⅛ to about ¼ the width of the burners, in order to take full advantage of the heating effects of the hot combustion gases discharging from the burner faces when the burners are operating.

The gaps between individual burners of a row can have their radiation interrupting effects reduced by shaping the burners so that these gaps extend at an angle with respect to the direction of paper movement. This will spread the radiation interrupting effect over wider portions of the paper, or even over the entire width of the paper.

The radiation interruption at the gaps is also reduced by a tapered thickness reduction at the free edges of the burner side walls, as shown in FIG. 31 of Ser. No. 94,901. The burner matrixes 1176 are sufficiently resilient that they can be squeezed into place against such tapered walls and thus effectively reduce the width of the outer lip of the wall to about 1/16 inch even though the balance of the wall is about ⅛ inch thick.

As pointed out above, the movement of the hot combustion gases over the flared surfaces 1160 heats up those surfaces to temperatues that come close to the temperatures of the incandescent burner faces, particularly when those surfaces are of low density thermal insulation. The resulting high temperature of surfaces 1163 will accordingly generate additional infra-red radiation that helps dry the paper 1110. This additional drying is provided without increasing the amount of fuel used, so that the fuel efficiency is greatly improved.

FIGS. 12 and 13 further show the provision of a burner igniter in the form of a spark-fired pilot flame director 1178. This can be provided with its flame-detecting rod 1179, or if desired an ultra-violet detector 1180 can be fitted at the opposite end of a row of burners, to detect burner operation when the burners are being lit, and automatically shut down the gas feed if the burners do not ignite or if they should be inadvertently extinguished.

The grooving 1161 preferably has a depth of at least about ⅛ inch, and this depth can be as much ½ inch. The grooving effectively increases the surface 1161 as compared to a perfectly flat surface, and an increase of at least about 50% is desired. To this end the profile of the grooves can be triangular, rectangular, sinusoidal, or have any other shape.

The combustion gases discharging from the far ends of the surface 1161 can still be sufficiently hot to warrant their use as for heating a further radiating surface. Thus those gases can be sucked through a porous insulator such as a ceramic fiber matrix positioned as an outer extension of surfaces 1161. The resulting relatively forceful flow of still hot gas through the porous matrix heats it up more effectively than the surface 1161 is heated, so that the heated face of the porous ceramic fiber matrix can contribute a significant amount of additional infrared radiation.

The use of the surfaces such as 1161, with or without the foregoing extensions improves the operation of any fuel-fired burner that generates hot combustion gases. Thus burners 1130 can be replaced by ceramic tile burners, metal screen burners, or ceramic cup type burners, or even direct flame burners, and in each case the burner operation shows a similar improvement.

The individual burners 1130 in the assembly shown in FIG. 13 are preferably dimensioned so that different burners or groups of burners 1130 can be operated. In this way all the burners can be operated to heat a web 1110 of maximum width, and smaller numbers of burners can be operated to heat webs of smaller widths. Shutting down one or more burners has been generally effected with minimum construction cost by shutting off the flow of the propane or other combustible gas to those burners while permitting continued flow to those burners of the air otherwise mixed with that combustible gas to make the combustion mixture.

The same combustible gas shut-off has been used for emergency shut-downs, as for example, when the web stops advancing and it is necessary to keep the stopped web from becoming charred by the burners. However, such gas shut-offs are not prompt enough for certain stoppages such as when the web is a paper being printed at high speed with ink that requires heat treatment to dry rapidly. Such printing machines can be stopped in less than a second or two when there is an emergency such as tearing of the paper web. For such very abrupt stopping, it is desirable to rapidly trip shut the air supply to the mixer. This immediately stops the flow of combustion mixture and extinguishes the burner. The ceramic fiber matrix on which the combustion had been taking place, prevents flash back of the flame toward the mixing equipment and thus prevents damage.

Additionally or alternatively, the stopping or excessive slowing down of the printed web can cause the tripping of snuffer bars as in FIG. 35 of Ser. No. 628,989 to act as fire dams that engage the web downstream, or downstream and upstream of the heater to snuff out and prevent the spread of fire on the web.

The standard mixing equipment includes a so-called zero-pressure regulator which is designed to prevent flow of gas to the burner when the flow of air is interrupted, but when other types of mixing equipment is used, it is desirable to have the emergency shut-down at both the air flow and the gas flow. Electrically operated solenoid valves made it simple to simultaneously and very abruptly shut off both those flows.

Such simultaneous shut-offs may also be desirable even when zero-pressure regulators are used for mixing. The use of a solenoid-operated gas valve is very helpful when an installation contains several burners, some of which are to be selectively kept out of use on occasion. Also, the closing of the gas valve permits simpler cycling of the burner safety system for relighting.

It is generally desirable to have the burners located below the work being irradiated inasmuch as the burner body is then not subjected to so much heating and the resting hot combustion products remain longer in contact with the work thus increasing the heating effect. In some cases, however, the only practical installation has the burner firing face down over the work.

Where burner bodies are to be kept as compact as possible as, for example, when mounted in a confined space as in FIG. 6 of Ser. No. 186,491, a burner can have the construction shown in FIGS. 15 and 16. In this construction the burner 1302 has no airseal, and its matrix 1304 is fitted directly in the open mouth of an open burner box 1306, as in FIG. 5 of Ser. No. 186,491.

The burner box can have a gas-tight construction and be made of aluminum or stainless steel, or plain carbon steel. Before inserting the matrix, there is mounted in the burner box a set of partitions 1311, 1312, 1313 and 1314 that encircle its four walls. Each partition is shown as L-shaped in cross section with the short arm of the L positioned to form a ledge 1320 against which the matrix rests. Such a shelf need only be about ½ inch wide and makes a very desirable stop that keeps the matrix from penetrating too deeply into the box when the matrix is installed. The matrix is preferably cemented in place in the manner described above.

Partitions 1312 and 1314 are shown as extending the full length of the interior of box 1306, while partitions 1311 and 1313 extend from partition 1312 to partition 1314. Openings 1322 are punched in the ends of partitions 1312 and 1314 so as to interconnect the chambers formed between the partitions and box wall. One partition end 1330 can remain unpunched and inlet and outlet tubes 1335, 1336 fitted in the wall of the box on opposite sides of this unpunched end, for the inroduction and removal of a cooling fluid.

The partitions are installed by dip-brazing or welding, so that the coolant chambers they form are gas tight. The cooling fluid can be tap or deionized water, where the chamber walls are stainless steel or aluminum. Some boilding point depressant like ethylene glycol can be added to such water, particularly where the interiors of the coolant chambers are as narrow as ⅜ inch inasmuch as parts of the box wall can then reach a temperature above the normal boiling point of water, when the burner is in operation. Such an additive also reduces the danger of freezing when the burner is not operating and is exposed to a very cold climate.

It is also helpful to add a corrosion inhibitor such as zinc chromate to coolant water if that water comes into contact with plain steel or even aluminum.

The coolant inlet and outlet tubes are shown as emerging from the back wall of the burner box, but they can instead be fitted to a side wall, as where not enough space is available in back of the back wall. The combustion mixture inlet 1340 is also illustrated as fitted in the back wall and can likewise be moved to a side wall. Such a side wall mounting can have the combustion mixture inlet penetrate through the box side wall and through the adjacent partition, but if desired that partition can be interrupted so that it does not extend over such as side-wall installation, or that partition can be completely omitted.

Figure 15:
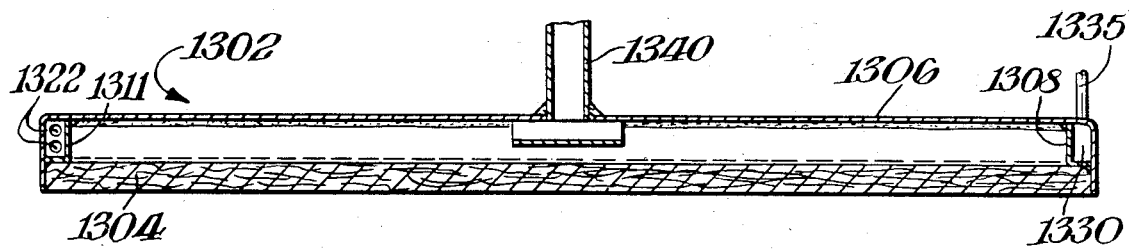
FIGS. 15 and 16 are sectional and face views, respectively, of a liquid-cooled burner of the present invention.
Figure 16:
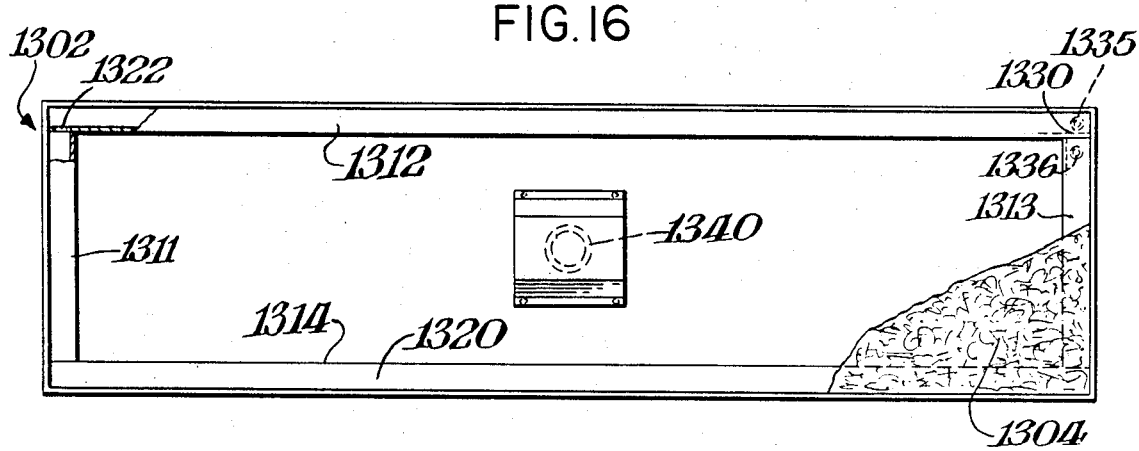

The burner of FIGS. 15 and 16 can also be made by a casting technique so that all of its metal structure is formed in one operation. Its coolant chambers can also be enlarged and brought into close heat-exchange relation with the incoming gaseous combustion mixture, so that the coolant need not be supplied and withdrawn to keep it from overheating. Instead the enlarged coolant chambers can be kept disconnected from circulation conduits and have fins on their combustion-mixture-contacting surfaces for better heat-exchange with the combustion mixture. In addition such chambers can have their coolant contents exposed to the atmosphere so that it can boil a little if overheated.

Partitions 1308 can be made of simple flat sheets welded or brazed in place, instead of L-shaped members. Such flat sheets can span the corners between the back and side walls of a pre-formed burner box, and need not provide a ledge for the matrix.

The infra-red heating of the present invention can be applied as the first or the last heat treatment stage of a wet web, or at any intermediate point in the drying of the web. Because the gas-fired burners have an exceedingly high power density and can be made of almost diminutive size, they can be readily fitted into compact spaces and retrofitted in many prior art types of dryers.

As described in Ser. Nos. 186,491 and 435,412, their use as the last heat treatment stage is particularly effective for adjusting the moisture profile across the width of a paper web as it is manufactured. Thus, as in the construction of FIG. 6 in Ser. No. 186,491 now U.S. Pat. No. 4,378,207, a set of drying drums can have a profile drier retrofitted into the cramped between-drum space one or two drums before the last drum of the set, and then the last drum or two can be deenergized so as not to contribute any significant drying.

The profile driers of Ser. No. 186,491, U.S. Pat. No. 4,378,207, can be used as can the apparatus of FIG. 16A. In this figure, a paper web 200, after leaving the last drying stage, is looped around rollers 201, 202, 203 and 204 so that it moves past two banks 211, 212, of radiant heaters. Each heater can extend only about 6 inches or so along the widths of the web, and can extend 18 to 30 inches in the machine direction. One face of the web is irradiated by one heater bank, and the other face by the other bank. The heaters in each bank can be crowded together to cover the entire web width, or they can be spaced from each other, as illustrated. For profiling purposes, only a few of the heaters are operated, in order to reduce the moisture content of the web in the width zones of the operated heaters, and this is controlled by standard automatic moisture profiling measurement equipment.

Figure 16A:
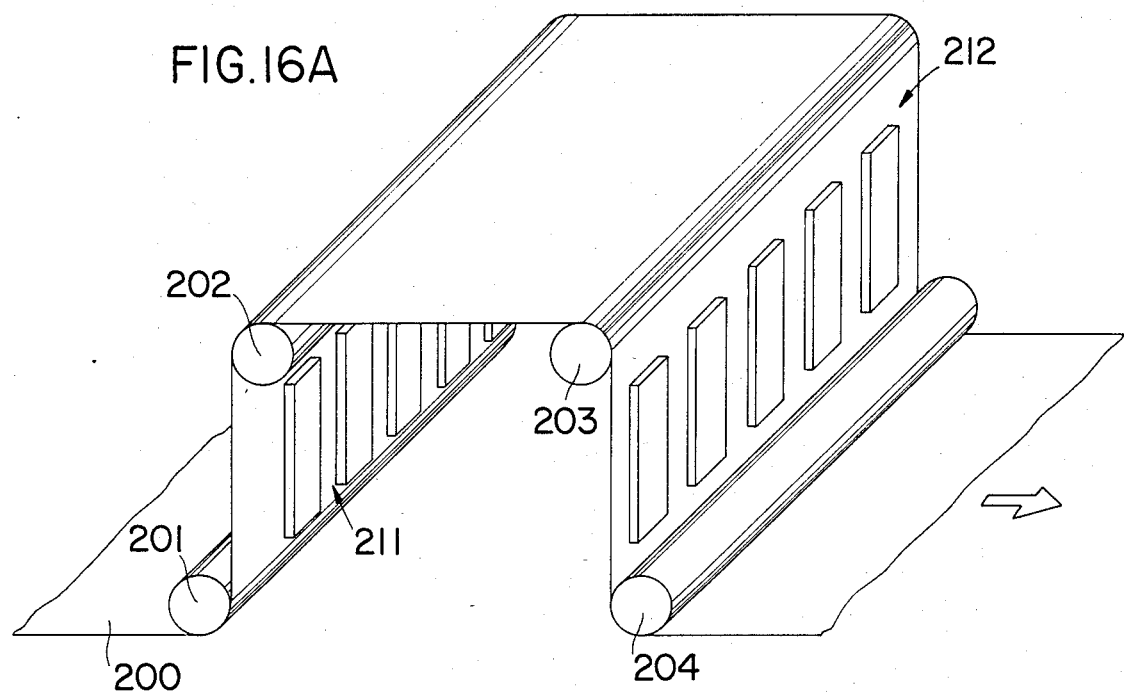
FIG. 16A is an isometric, schematic view of an irradiation type moisture profiling technique in accordance with the present invention.

When the heaters are spaced from the others in the same bank, they are desirably offset from the similarly located heater in the other bank, as also illustrated in FIG. 16A. This enables the entire web width to be exposed to the heaters.

When crowded together, the heaters provide double exposure of each width zone of the web, each exposure being at a different face of the web. Such two-sided heating gives more effective moisture loss than the corresponding two treatments on the same face.

The individual heaters can be controlled by merely turning them on or off, inasmuch as the amount of drying they effect is quite small. However, a modulation can be arranged, if desired, as by partitioning each heater into top and bottom sections, one section being twice as ong in the machine direction, as the other section. This provides four degrees of operation—one with both sections off, a second with only the shorter section on, a third with only the longer section on, and a fourth with both sections on. The similar use of three sections per heater provides eight degrees of operation when the section lengths are in a 1:2:4 relation.

Modulation can also be arranged as by throttling down the flow of air used to receive a proportionate amount of combustion gas to form the combustion mixture that is fed to the individual burners or burner sections. Instead of using the standard type of air valves for this purpose, the inexpensive and compact valve contruction of FIG. 16B is preferred.

Figure 16B:
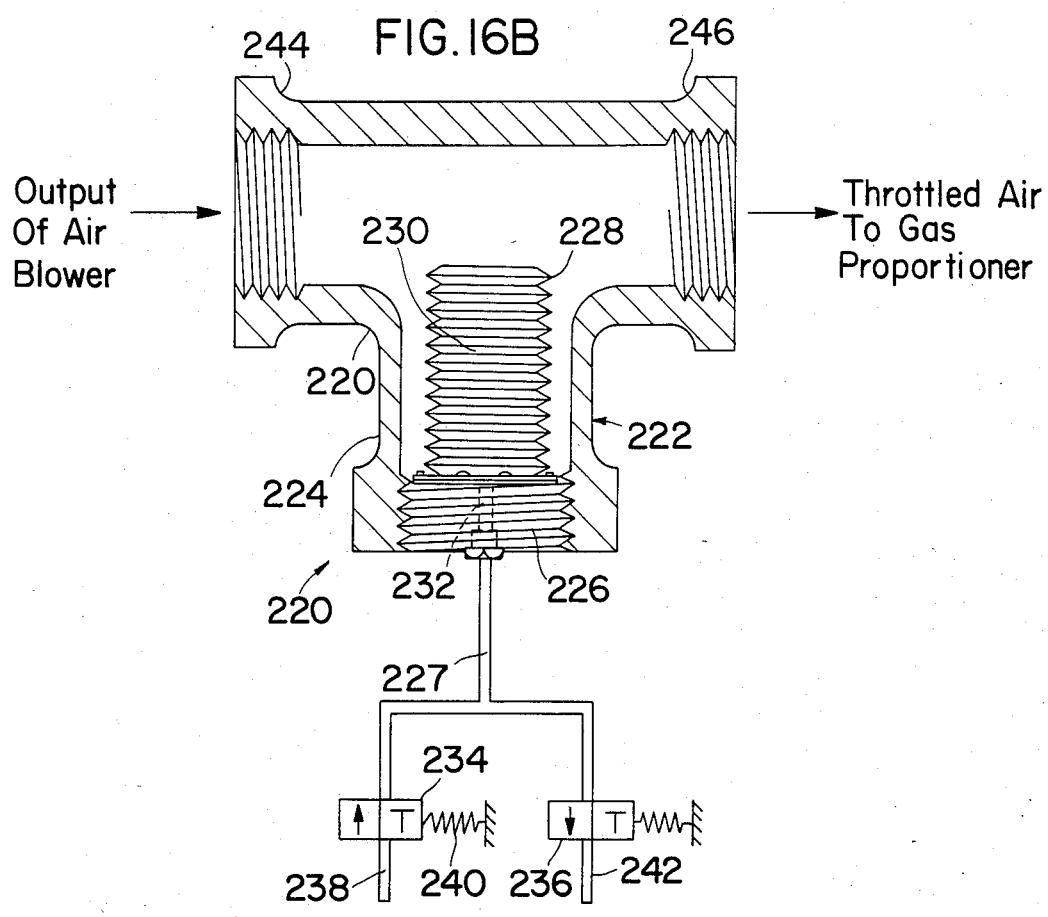
FIG. 16B is a cross-sectional view of a control valve pursuant to the present invention.

In the construction of FIG. 16B, modulating valve 220 is essentially a pipe tee 222 having the tee stem 224 closed by a plug 226 threaded or forced in place, the plug carrying a metal or rubber bellows 228 the interior 230 of which is sealed gas-tight against the plug. A control passageway 232 penetrates through plug 226 and is connected by conduit 227 to actuating controls 234 and 236. Control 234 is connected by line 238 to a source of pressurized air, and is shown in non-actuated position as by bias spring 240, in which position it blocks access to conduit 227. When actuated, manually or otherwise, it connects line 238 to conduit 227 and thus causes pressurized air to be forced into the interior of bellows 230, thus expanding the bellows.

Control 236 when non-actuated similarly blocks conduit 227, but when actuated, opens conduit 227 to vent line 242. This releases air from the interior of bellows 230 and causes the bellows to contract.

A single self-centering toggle lever can be mechanically connected to activate control 234 when toggled to one side of its center, and to activate control 236 when toggled to the other side of its center.

One arm 244 of tee 220 can be connected to a supply of the air to be modulated, as shown in FIG. 16B, and the other arm 246 connected to a gas proportioner such as a ventur fed by a so-called zero pressure regulator on the feed line of an industrial supply of natural gas or propane or the like.

Operating the controls 234 and 236 permits the throttling of the air delivered at 246, in accordance with the degree the bellows is expanded. Since the burners or burner sections can be kept lit at low intensity even when not needed for drying, there is no need to have valve 220 act as a shut-off. Shutting off of air is very simple to effect by merely switching off the blower that supplies the air to arm 244. Moreover, zero-pressure regulators are generally arranged to automatically stop the flow of combustible gas when the blower is switched off.

The bellows 228 accordingly does not have to completely block the flow of throttled air. Indeed, the turning off of combustion mixture to a gas-fired burner in industrial equipment requires a safety sequence before the burner is turned on again, and is best avoided when practical.

When the heaters are spaced from adjacent heaters, they can also be shiftable as, for example, by the movable mountings of U.S. Pat. No. 4,514,913, so that they can be located over the width zones which are in need, or in greatest need of additional drying. Such shiftable heaters may be as narrow as four inches or even less in the cross-machine direction. In general, however, such widths can range up to eight or even ten inches for shiftable or non-shiftable heaters.

Figure 16C:
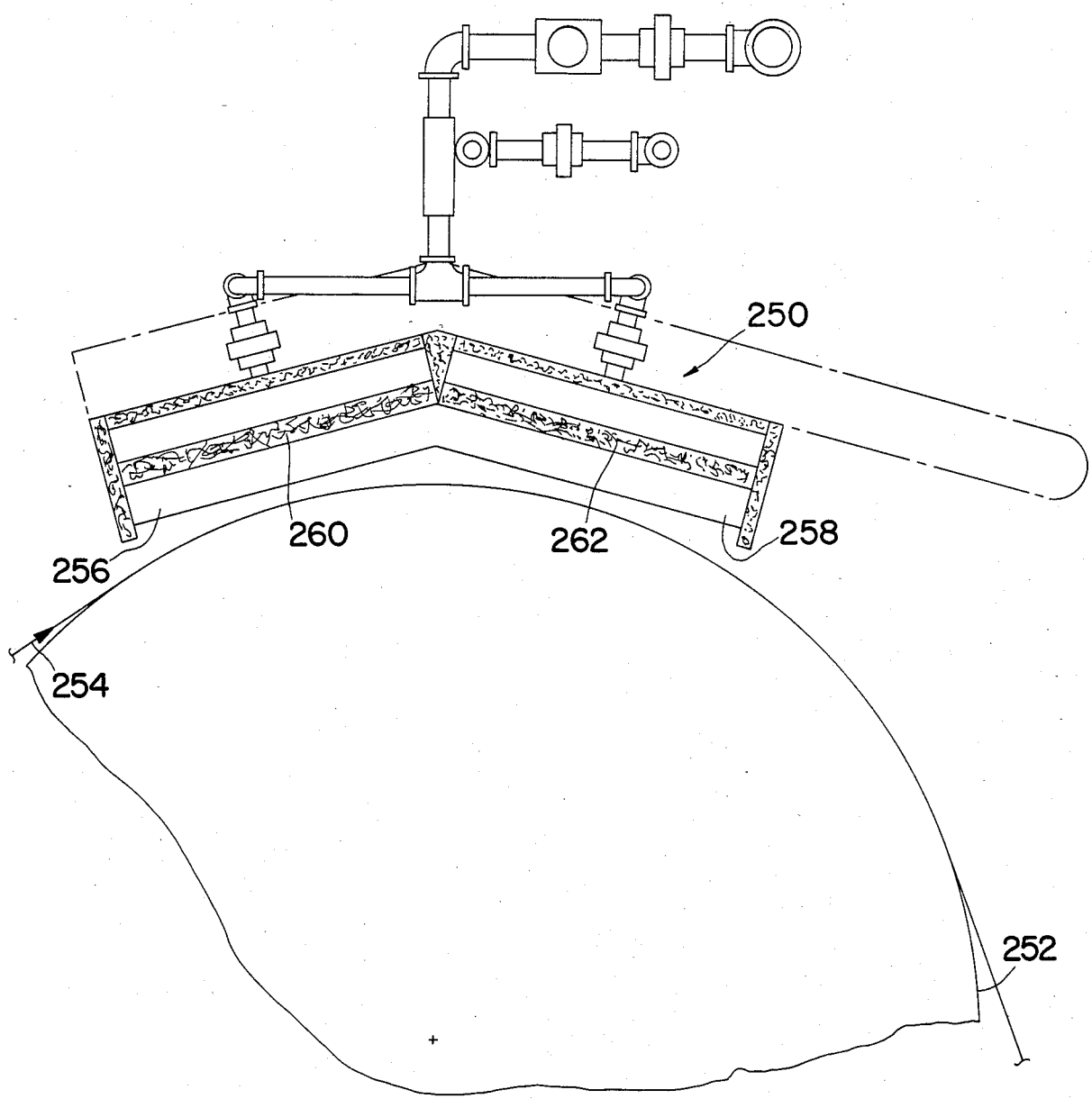
FIG. 16C is a cross-sectional view detailing a modified moisture profiling technique of the present invention.

By having the FIG. 16A apparatus as the last heat treatment before winding up the dried web, particularly effective moisture profiling is enabled. Similar high-efficiency is obtained by doing the profiling on the last drying drum of a papermaking line. This is illustrated in FIG. 16C where a burner assembly 250 is mounted very close to such a drying drum 252 over which a paper web 254 is trained. Assembly 250 has two individual burners 256 and 258, each with its own flat burner matrix 260, 262, about 2½ inches from the paper web and tilted about 15 to about 30 degrees to approximately follow the contour of drum 252. If desired, the matrixes 260 and 262 can be curved in the shape of cylindrical segments to even more closely follow the drum contour. Screen type burners or ceramic plate burners can also be used for profiling.

A single throttle control can be used to control a number of burners or burner sections that heat the same width portion of a web being profiled.

Figure 17:
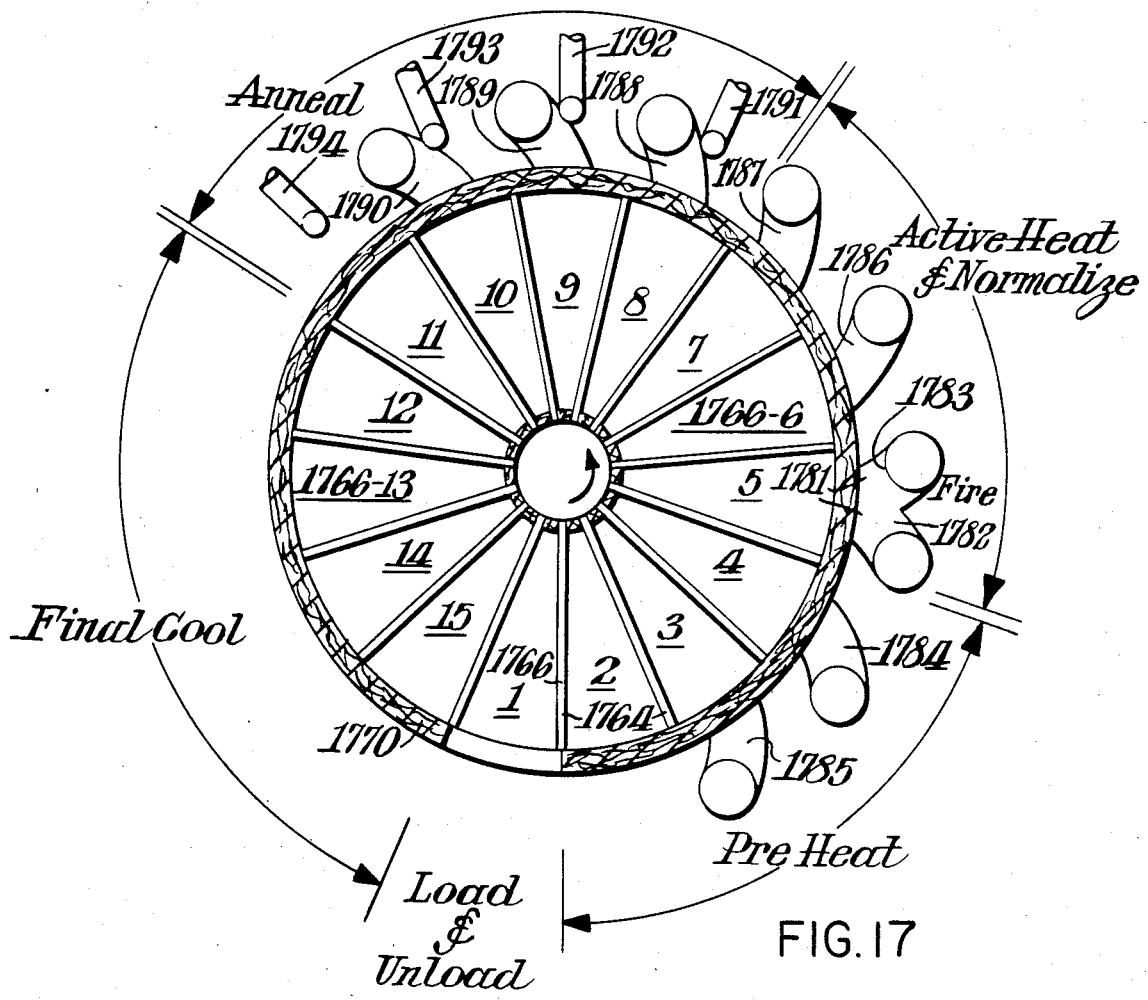
FIGS. 17 and 18 are horizontal and vertical sectional views of a rotary annealing heater according to the present invention.
Figure 18:
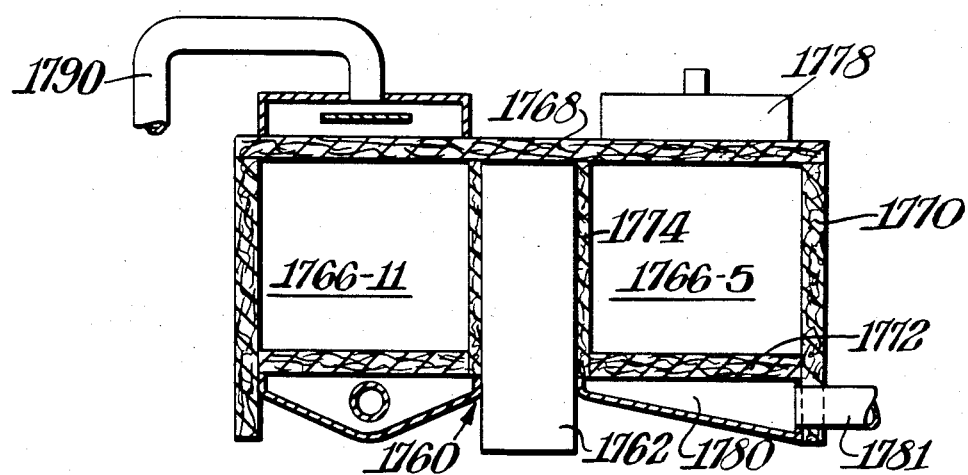

FIGS. 17 and 18 illustrate an annealing oven for annealing materials such as glass articles. This oven has a circular table 1760 of perforated metal plate mounted on a central pedestal 1762 rotated around its vertical axis by a motor-driven Geneva drive which causes the table to rotate in small steps. As shown in FIG. 17, the table top is fitted with a number of compartments 1766-1 through 1766-15.

The number of compartments corresponds to the number of table-rotating steps required to make one complete table revolution. The tops of the compartments are covered by a roof 1768 supported by a fixed circular outer wall 1770 and which can also be supported by a rotatable mounting on the top of the pedestal.

The entire inner surface of each compartment is made of thermal insulation, such as molded ceramic fiber boards that withstand the highest temperature in the oven. Roof 1768 can be essentially entirely relatively rigid board of such type, with provision for mounting in or on it a number of components as described infra. Wall 1770 can similarly be curved relatively rigid board, preferably assembled from a series of arcuate portions secured together as by cemented butt joints of the type disclosed in U.S. Pat. No. 4,290,746. Wall 1770 is preferably externally re-enforced by a facing sheath of metal or the like to protect it against physical damage, and its arcuate insulation portions can be cemented to such metal sheathing.

Partitions 1764 can be stiff metal sheets or plates secured to the table and pedestal, and covered on both faces with thermal insulation boards that are anchored in place. The compartment floors are separate thermal insulation board segments 1772 each merely placed on the table top so that they can be easily removed and replaced. The thermal insulation is completed by thermal insulation strips 1774 secured to the outer surface of the pedestal.

All of the insulating members are fitted together to leave essentially no gap between them except at the side wall 1770 and roof 1768. At these locations a gap no greater than one to two millimeters is preferably provided to permit the edges of the partition to move by without wear or abrasion. Those partition edges as well as outer floor edges may be covered with thin sheet metal that can fill up the gap and slide over the opposing insulation surface with little or no wear. Thus a stainless steel foil about 6 mils or about 1/7 millimeter thick will do a good job of reducing wear without conducting away any significant amount of heat.

Above compartment 1766-5 is mounted a gas-fired heater 1778 fitted over or in a cut-out section of the roof, to heat the contents of that compartment to normalizing temperature for example. The insulating floor 1772 is made relatively porous, and below the floor of that compartment is a plenum 1780 that collects the hot gases from the heating in the compartment and conducts those collected gases to transfer conduit 1781. This transfer conduit forks into two branches 1782, 1783, the first leading to the top of compartment 1766-4 and the second to the top of compartment 1766-6. At those locations they fit in openings in the roof so that the hot gases in these conduits flow down through those adjoining compartments, as indicated in FIG. 18 for a different compartment.

Additional conduits 1784, 1785, 1786, 1787, 1788, 1789 and 1790 similarly lead from one compartment to the next to further transfer hot gases from the bottom of one to the top of the other. Controllable dampers can be provided in branched conduits 1782 and 1783 to control the distribution of the hot gases from compartment 1766-5.

Compartments —5, —6 and —7 are shown as normalizing compartments in which the articles to be annealed are brought to and held at temperatures that prepare them for the controlled annealing cool-down which takes place in compartments —8, —9, —10 and —11. The ducts feeding hot gases into those cool-down compartments can have auxiliary feed ducts 1791, 1792, 1793 and 1794 to supply a small controllable portion of cooler gas such as ambient air, to cool down the transferring hot gas as required for the annealing cool-down. Smaller blowers can be mounted in plenums or conduits and used to help with the various gas transfers.

The insulating ceiling board is preferably essentially completely gas-tight so that the gases in the compartments are not dissipated to any significant extent through their roofs. A somewhat greater degree of porosity can be tolerated in the pedestal covers 1774 and partitions 1764 when they are backed up by barriers such as imperforate metal walls. Some porosity can also be tolerated in partitions constructed with perforated metal sheet or with metal edge frames, inasmuch as the leakage of a little gas from one compartment to an adjacent compartment is not serious. However the compartment floors are preferably so porous as to not too seriously impede the flow of gas through them. One of the small gas-transfer blowers can make up for any pressure drop.

The gases exhausting from the anneal cool-down in compartment —11 are still quite hot and can be supplied to compartments —2, —3 and —4 or any of them, to help pre-heat the articles to be annealed. Such supply can be in addition to or take the place of the transfer to the pre-heat from firing compartment —5.

The air in compartment —12 where the final cool-down begins after the controlled annealing, is heated by the freshly annealed still hot articles, and this heated air can be drawn out and also delivered to any of the pre-heat compartments. Such expedited cooling in compartment —12 can make it unnecessary to have compartments —13, —14 and —15.

If desired the total number of compartments can be reduced to very few. Thus a five-compartment structure can have one pre-heat compartment, one normalizing compartment, one annealing, or critical cooling compartment, one final cooling compartment, and one load and unload compartment. The excess heat generated by the burner installation in the normalizing compartment in the form of excess hot combusted gas, can then be cycled over to the preheat compartment, and even lower temperature hot gases can be withdrawn from the final cooling compartment and delivered to the same pre-heat compartment. Both recycled hot gas streams can be mixed, or can be fed into the pre-heat compartment independently at different locations in that compartment or at separate times between steps.

The used recycled gases can be vented through the floors of the pre-heat and/or final cool compartments. However, it may be desirable or even essential to shut down the burner operation before the end of a step in the table rotation, in order to add a normalizing dwell to the active heat dwell in the normalizing compartment. During such burner shut-down, the venting can be blocked as by providing a flapper valve or damper below the floor of both the pre-heat and final cool compartments. Plenums 1780 can be fixed in place and secured to wall 170, or they can be fixed to the floor so that they rotate with the table. In the latter construction, the venting shut-off valves can be fitted to the plenum outlets, if desired.

A six-compartment construction may be more desirable than a five-compartment construction. Not only does the six-compartment construction provide greater annealing capacity for any size table, but it also can improve the energy efficiency. Thus the sixth compartment can be an extra pre-heat compartment, receiving hot gas recycled from the hotter normalizing compartment, while all the recovered hot gas from the final cool compartment can be recycled to the other cooler pre-heat compartment.

A seven-compartment table can be still better in that it can not only provide better heat recycling, but it can also provide a normalizing compartment separate from the active heating compartment. The latter feature enables continuous operation with the burner installation also burning continuously.

Compartment —1 is used for loading and unloading the articles being annealed, as by sliding out the article-carrying insulating board that constitutes the floor of that compartment, and replacing it with another floor board carrying fresh articles. Wall 1770 is left open at this location for that purpose.

When starting up the oven and the articles to be annealed have not yet reached compartment —6, the gas transfer from compartment —5 can be directed entirely or substantially entirely to the pre-heat compartments to speed the pre-heat and increase the heating efficiency. The stepping of the table can then be accelerated to take advantage of the faster pre-heat.

An annealing sequence that calls for a fifteen-minute normalizing followed by a twenty-minute controlled anneal cool-down can in the foregoing apparatus be readily effected with table stepping every five minutes. Other sequences can similarly be provided with suitably modified compartmentation and stepping. If desired the outer wall 1770 can be frusto-conical in shape so that it tapers together at the top, and the wall and roof raised a little every time the table is stepped, lowered again when the step is completed. Such raising provides extra clearance between the partition edges and the roof as well as wall, so that the table rotation then causes less wear of the insulation. As little as a 3-millimeter raising to provide a 1-millimeter clearance at wall 1770 is very effective, and in such event the insulation can be tightly fitted all around each compartment when the roof is in its down position.

Heater 1778 can be any heater that supplies hot combustion gases, but preferably also supplies high intensity infra-red radiation. The transfer of the hot gases between compartments can take other forms and can be from and to any portions of the respective compartments, such as the sides and roof. The pedestal can be hollow with its hollow interior also used for gas transfer.

Figure 19:
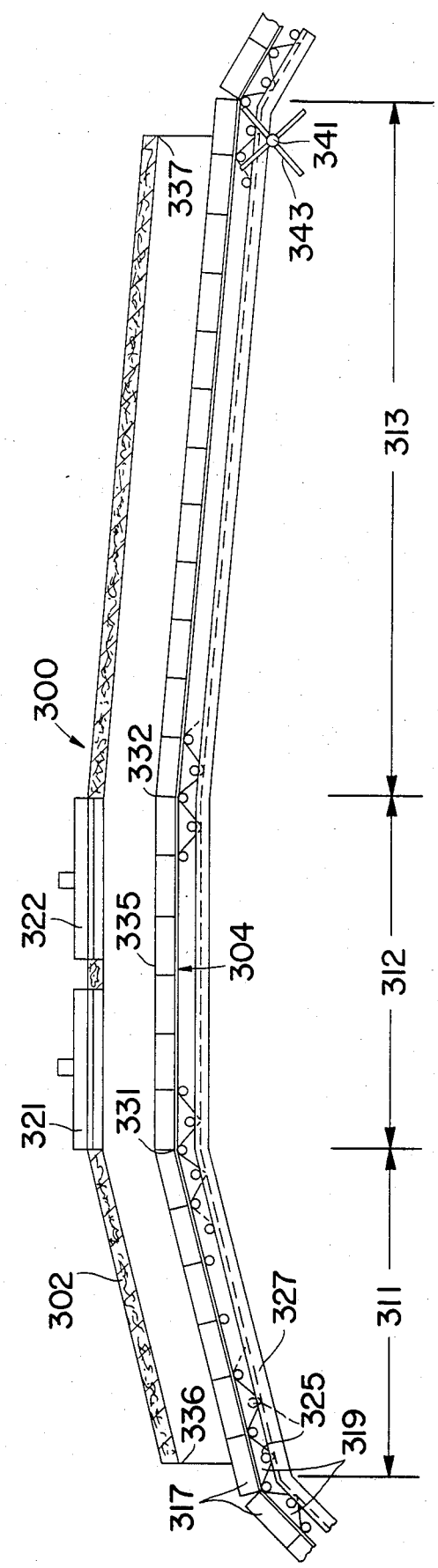
FIG. 19 is a vertical sectional view of a different annealing apparatus of the present invention.
Figure 20:
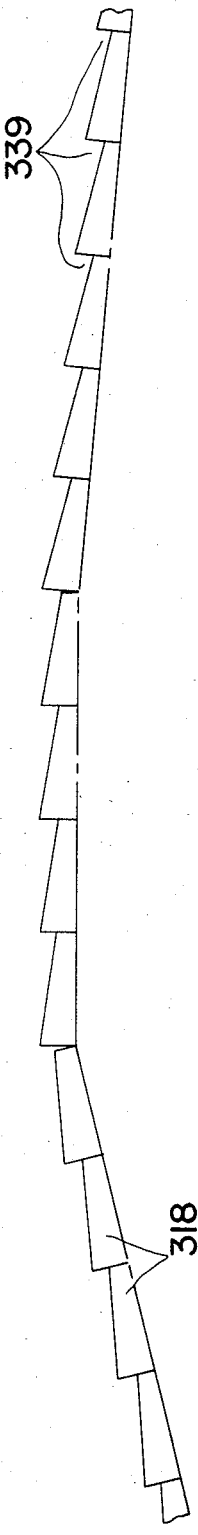
FIGS. 20, 21 and 22 are detailed views of modifications of the apparatus of FIG. 19.
Figure 21:
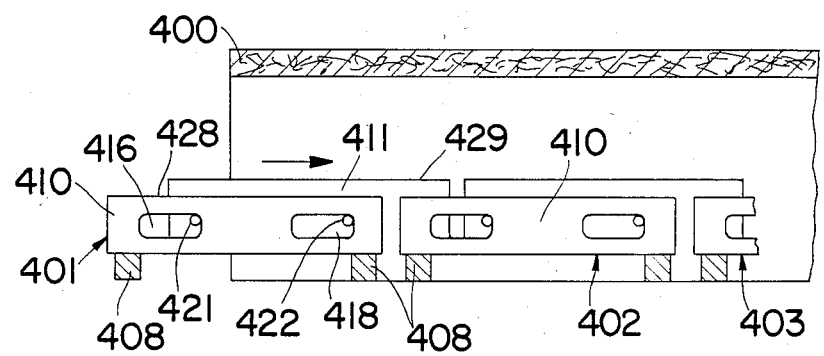
Figure 22:
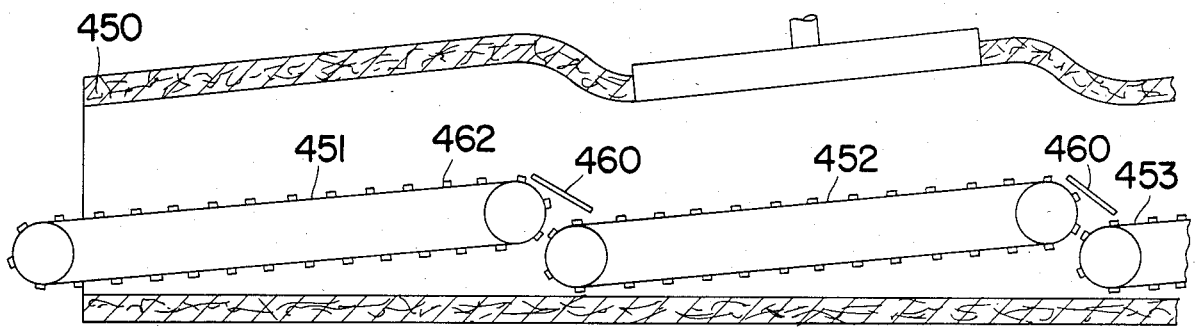

The radiant heating burners of the present invention are particularly suited for use in glass annealing lehrs, such as illustrated in FIGS. 17 and 18 or in those described below. In FIG. 19 a lehr 300 is shown as an elongated heating tunnel 302 through which moves the upper flight 304 of a conveyor that carries electric light bulbs or other glass articles to be annealed.

The heating tunnel 302 has three sections, an inlet section 311 which is inclined upwardly, a heat-up section 312 which is shown as horizontal, and a long cooldown section 313 shown as inclined downwardly. The tunnel has its side walls and roof made of thermally insulating material such as felted ceramic fiber mats which can be two or more inches thick. Burners 321 and 322 are fitted into openings in the roof of heat-up section 312 and face downwardly to direct their high intensity infra-red energy down onto the conveyor flight 304 and the glass articles carried on that flight. The burners also discharge into the tunnel large outputs of hot combustion gases they generate.

To the extent that the lower face of burners 321 and 302 contain metal components such as matrix holddown flanges 210 of FIG. 10, such components are best covered by thermal insulation as in the construction of FIG. 8 in U.S. Pat. No. 4,272,238. The sides and upper surfaces of burners 321 and 322 need no thermal insulation; the sides are in contact with the thermal insulation of the roof and thus shielded from absorbing excessive heat from the tunnel, and the upper metal portions of the burners can be left exposed to the atmosphere above the tunnel inasmuch as this arrangement will not cause overheating of the metal.

The work-carrying conveyor is preferably made of a succession of thermal insulation blocks 317 each cemented to a sheet metal plate 319 having a downwardly bent flange equipped with rollers 325 to ride over a slotted guide surface 327. Each plate 319 is pivoted at its leading and trailing edges to the adjacent plates, and the plates are not physically carried into the tunnel but are exposed to the atmosphere below the tunnel. The plates are accordingly not directly heated by the tunnel atmosphere or radiation, except at the small gaps at 331, 332, where the conveyor flight 304 goes through minor changes in direction. These gaps are preferably located so that they are not under a burner in order to minimize the amount of radiation that penetrates into the gaps.

Insulation blocks 317 are as wide as the tunnel interiors. To reduce the frictional effects of the tunnel side walls on the sides of these blocks, the block sides can be covered with metal foil that can be cemented on by way of example, and thus slide against the tunnel wall surfaces without significant damage.

The interior of the heating tunnel can be as much as 40 or more inches wide so as to treat large as well as small articles. The height of that tunnel interior is generally at least about two, preferably at least about four inches and not over six inches more than the height of the articles to be treated. Thus a nine-inch high tunnel interior does a very good job annealing articles about three inches high. Only two of the doubled burners of FIG. 10 are generally sufficient to provide all the heating needed for even the widest tunnels.

The floor 335 of the tunnel interior in section 312 is preferably at a level a little higher than the top 336 of the tunnel entrance, and also a little higher than the top 337 of the tunnel exit. This relationship is provided by suitably inclining tunnel sections 311 and 313. Section 311 can thus be inclined upwardly about 10 to 15 degrees, and section 313 inclined downwardly about 3 to 6 degrees. In such an arrangement the hot combusted gases generated by the burners accumulate and fill section 312 completely, down to its floor 335, before these gases spill out upwardly from the tunnel's inlet and outlet openings. The articles being annealed are thus assured of thorough heat-up in section 312.

The top 337 of the tunnel outlet is preferably a little higher than the top 336 of the tunnel inlet, so that the hot combusted gases preferably spill out of the tunnel's outlet. This enables section 313 to maintain a graded temperature that diminishes from the high heat-up temperature required in section 312 to the low terminal annealing temperature at the tunnel exit. The hot combusted gases in section 313 cool as they flow to the outlet inasmuch as there is a loss of heat through the tunnel walls, ceiling and floor, and such loss is larger than the heat input provided by the flow of combusted gas and the movement of the conveyor flight with its load of articles. This loss of heat can be controlled as by varying the thickness of the walls and ceiling, to provide any desired annealing profile.

Where the articles being annealed are round and tend to roll down the inclined portions of the tunnel conveyor, the conveyor blocks 317 can be formed with depressions that receive the articles and thus keep them from rolling. Alternatively the blocks can be made wedge-shaped as indicated by the blocks 318 in FIG. 16, so that the tops of the blocks are horizontal or nearly horizontal as they climb up section 311. Such a modification will not help the articles roll down the downwardly sloping section 313, inasmuch as the junctures between adjacent blocks form pockets 339 that trap the articles.

The blocks can also be tapered in the opposite direction so that they carry upward in similar pockets the articles ascending section 311 of the tunnel. In such an embodiment, that opposite taper should be sufficient to maintain article-trapping pockets in the downwardly tilted section of the conveyor.

The entire tunnel 300 can be as much as 80 feet long or longer so that the conveyor flight can be moved at a rate as high as 20 or more feet per minute. Any convenient drive means can be used, such as the star wheel 341 with arms 343 engaging the hinge pins that connect the respective block supports 325 and project outwardly from those supports a sufficient distance to be engaged by arms 343. The conveyor also has a lower, or return, flight that is not illustrated but can take any form.

A feature of the construction of FIG. 15 is that the heat loss from the tunnel is extremely low. Thus a conveyor flight made of metal that goes through the tunnel in uncovered condition, can absorb and thus waste more heat than is absorbed by the articles being annealed. The heat loss of the FIG. 15 construction can even be further diminished by hanging over the tunnel's inlet and outlet curtains that hang down close to the tunnel floor and are pushed aside by the articles on the conveyor as those articles enter and leave. Such curtaining reduces the outflow of hot combusted gases and in this way permits the use of less burner firing to maintain the desired temperatures.

The modified lehr construction of FIG. 17 has a series of stepping conveyors the first three of which are shown at 401, 402 and 403. Each stepping conveyor is made of a series of vertically positioned aligned side-by-side metal sheets or plates some of which 410 are rigidly held in place as by being welded to lower supports 408. Plates 410 are provided with windows 416, 418 aligned with the corresponding windows of the remainder of the plates in the same side-by-side set.

Alternate plates in each set are slidable as shown at 411, being carried on stepping rods 421, 422 that extend through the aligned windows of the fixed plates 410. By moving the stepping rods in a stepping cycle, any articles resting on the upper edges 428 of fixed plates are advanced in the direction of the arrow and placed on the next conveyor set. This advance is effected by (a) first, lifting plates 411 upwardly to cause their top edges 429 to lift the articles up from the top edges 428 of the fixed plates;
(b) second, advancing plates 411 to carry the lifted articles forward;
(c) third, lowering the advanced plates 411 to deposit the lifted articles one step in the forward direction on the top edges 428 of the fixed plates; and
(d) fourth, returning the lowered plates 411 back to their original position without carrying the articles backward.

The foregoing sequence can carry the articles several inches per step along a conveyor and from one conveyor to the next, through the entire tunnel 400 of a lehr. The successive conveyors need not have their upper or article-carrying edtes at the same horizontal level. The stepping plates of one conveyor can deposit the articles they carry on the next conveyor even though the top of the next conveyor is an inch or so above or below the top of the first conveyor. Each conveyor can also be inclined upward or downwardly if desired, and provided with lugs that extend up from their upper edges to keep articles carried by them from rolling.

The stepping rods 421, 422 can extend out through the side walls of tunnel 400 and cammed through their cycles by external cam drives. Side wall drive slots through which the rods fit, can be covered by thermal insulation blocks projecting beyond the slots and fastened to and stepping with the rods, to reduce the loss of heat from the tunnel through the drive slots.

The individual conveyors of the construction of FIG. 17 are preferably kept out of good thermal contact with each other. Such an arrangement minimizes the transfer of heat from the hot interior of the tunnel to the relatively cold conveyor ends that project out the tunnel ends.

FIG. 18 illustrates another lehr construction in which heat losses are sharply reduced in a similar manner. Here a heating tunnel 450 is fitted with a series of belt conveyors including 451, 452, 453 that advance articles from one conveyor to the next through the tunnel. A small chute 460 is fitted between successive conveyors to guide the articles from one conveyor to the next. Each conveyor can be inclined upwardly, as illustrated to compensate for the drop in chute 460, and/or to carry its articles in an upward inclination. Cleat strips 462 can be secured to the conveyor belts to keep articles from rolling down any inclination.

The use of infra-red radiation to heat articles such as glass that are highly transparent to such radiation, has been found particularly effective for annealing those articles. It appears that the penetrating effect of the radiation makes its heating action significantly more diffuse and gradual than the heating action of hot gases alone, so that breakage due to thermal shock is reduced. Gas-fired infra-red radiation is even more desirable inasmuch as it is not only less expensive but the combustion gases emitted are not as hot as the combustion gases generated by simple burning so that they are less likely to cause thermal shock when used to help with the anneal heat-up.

Burner assemblies can be arranged to fire face down or to fire facing in either direction. Thus they can be connected together to make a radiant roof for heating glass lehrs for example. One convenient arrangement of this type has a row of elongated burners each connected by its ends to the opposite arms of an overhead rectangular frame. The burners can be spaced a little from each other to permit burnt combustion gases to escape between them, or they can be packed together, preferably with thermal insulation strips squeezed between adjacent burners, to keep those gases from escaping upwardly.

The supporting arms of the frame can be made of metal tubing and can thus also be used to pipe to the burners their gas requirements. Thus the piping frame can carry an air stream which is fed to the air-seal chamber of each air-seal burner in the group, and which is also fed to a gas-air mixer that is separately supplied with gas that it mixes with the air to make a combustion mixture fed to the combustion mixture plenums of the burners. Alternatively the burners can have connections at their opposite ends for receiving the respective supplies, with these ends coupled directly to and opening into the opposed arms of the piping frame, one of these arms carrying air alone, and the other carrying the combustion mixture. Flow-control valves can be provided in the combustion mixture connections to the individual burners for adjusting the burning pattern for the row of burners.

The radiant roof assembly can have its burners with or without air seals and needs no covering over the tops of the downwardly facing burners. Without such covering, the burner backs can be directly exposed to the external atmosphere so that those bare backs are thus subjected to very effective cooling by that atmosphere. If the maximum temperatures are desired for workpieces subjected to heating by the roof, it is preferable to use burners without air seals and packed together to minimize upward escape of the combustion gases.

Figure 24:
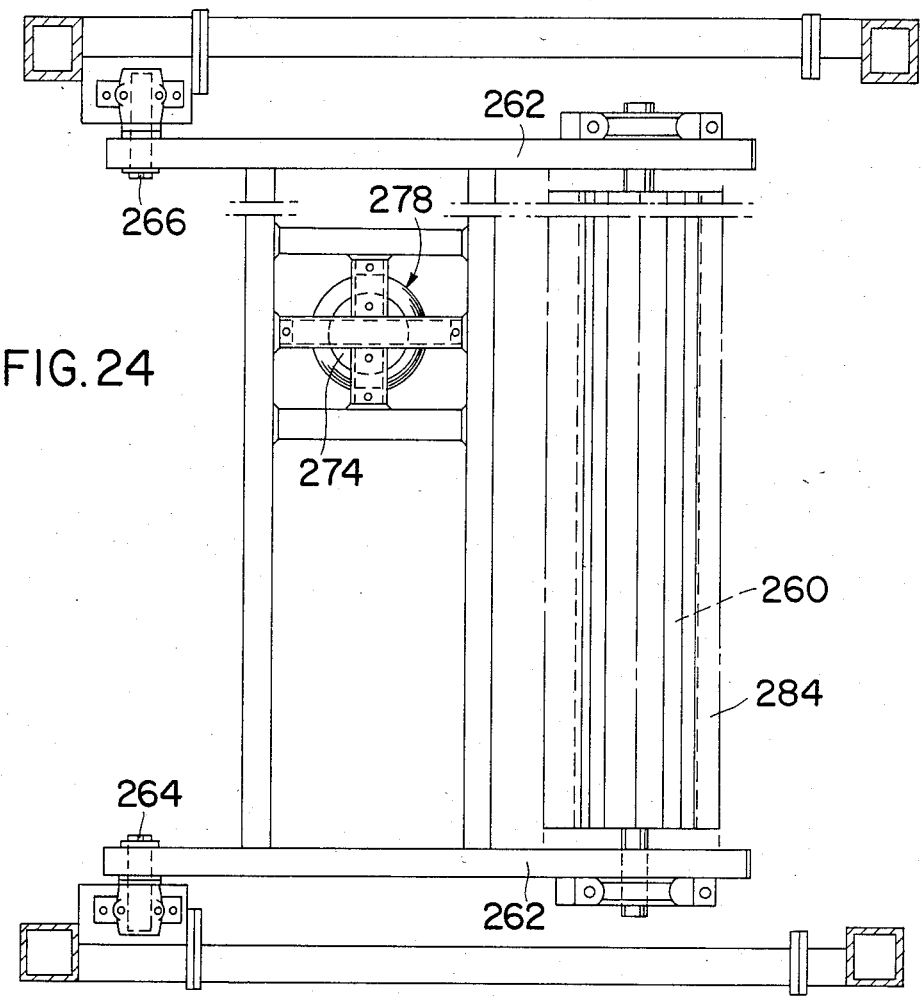
FIGS. 23 and 24 are side and plan views of an adjusting mechanism of the present invention.
Figure 23:
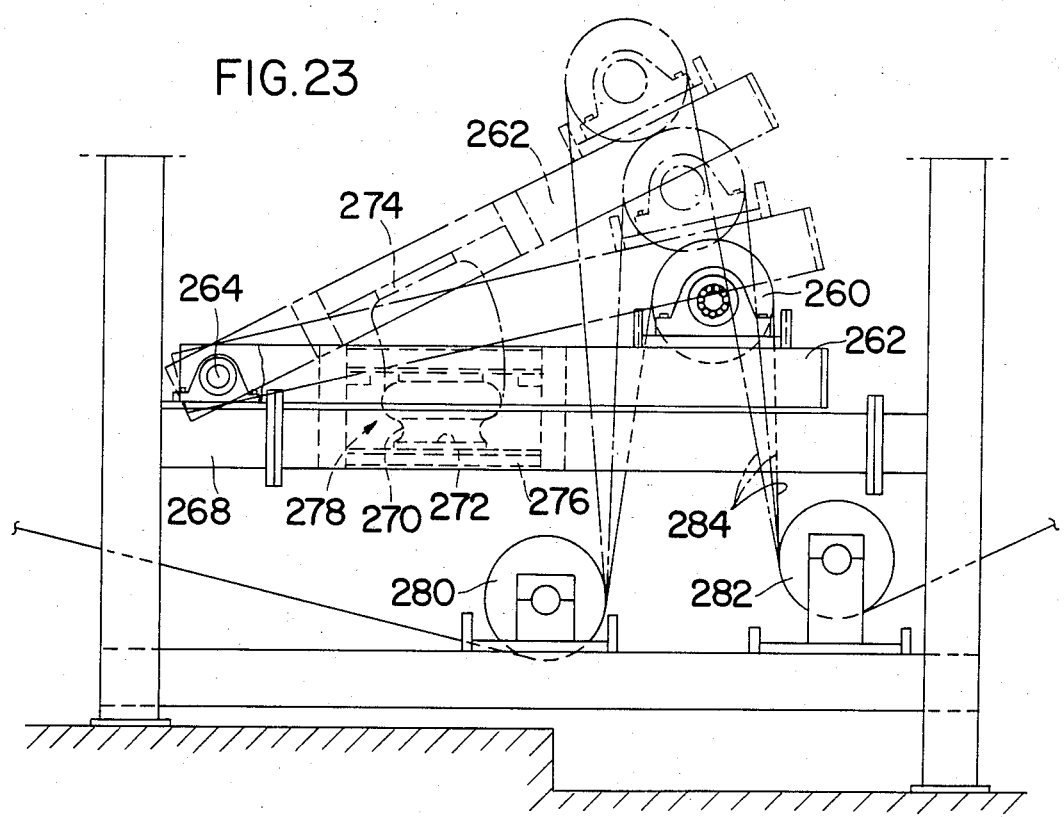

As a tensioning device for the foregoing conveyors and even for paper-machine fells that can be over 100 inches wide, it is preferred to use the pivoted tensioning frame of FIGS. 23 and 24. Here, a tensioning roller 260 is journalled at each end to the corresponding ends of an essentially rigid frame 262, which in turn is pivoted at 264 and 266 to an apparatus framework 268. The frame 262 is also resiliently held in a tilted up position as shown, by an air bag 270 having its ends 272 and 274 fitted between a cross member 276 on framework 268, and a bracket assembly 278 centrally mounted on pivoted frame 262.

The tensioning assembly is mounted to position its tensioning roller 260 above the space between two cooperating rollers 280 and 282 around which is framed the conveyor or web 284 being tensioned. By connecting the interior of the air bag to a source of air under a controlled pressure, the air bag will urge pivoted frame 262 upwardly with a force that can be correspondingly controlled and which will correspondingly maintain conveyor tension.

The apparatus of FIGS. 23 and 24 operates so smoothly and effectively that the air pressure in the air bag can be maintained at a fixed valve, to enable sustained operation without intervening adjustments, on paper-machine fells as wide as 120 inches and wider. The air pressure automatic adjustment usually used to respond to the load on one of the cooperating rolls 280 or 282 is not needed. The pivotal action and rigidity of frame 262 are key features of this action and to this end the frame should not permit a one millimeter deflection of the tensioning roller.

Obviously, many modifications and variations of the present invention are possible in light of the above teachings. It is, therefore, to be understood that within the scope of the appended claims the invention may be practiced otherwise than as specifically described.

I claim:

1. A gas-fired burner having a ceramic fiber mat held across the mouth of a rectangular elongated sheet metal burner body at least twice as long as it is wide and at least two feet long, to leave a shallow combustion mixture plenum about three-eighths to about one inch deep and having side walls between the mat and the back wall of the body, a rigidifying partition extending across essentially the entire plenum and welded at essentially all of its periphery to the interior of the plenum walls to divide the plenum into front and back compartments, and a combustion mixture inlet connected to the back compartment, the partition having spaced openings for passing combustion mixture from the back compartment to the front compartment.

2. The combination of claim 1 in which the burner body is at least four feet long.

3. The combination of claim 2 in which the burner body is made of stainless steel.

4. The combination of claim 1 in which the spaced openings in the partition extend around the partition's periphery.

* * * * *